(12) United States Patent
Lin et al.

(10) Patent No.: US 10,963,759 B2
(45) Date of Patent: *Mar. 30, 2021

(54) UTILIZING A DIGITAL CANVAS TO CONDUCT A SPATIAL-SEMANTIC SEARCH FOR DIGITAL VISUAL MEDIA

(71) Applicant: Adobe Inc., San Jose, CA (US)

(72) Inventors: Zhe Lin, Fremont, CA (US); Mai Long, Portland, OR (US); Jonathan Brandt, Santa Cruz, CA (US); Hailin Jin, San Jose, CA (US); Chen Fang, Hanover, NH (US)

(73) Assignee: ADOBE INC., San Jose, CA (US)

( * ) Notice: Subject to any disclaimer, the term of this patent is extended or adjusted under 35 U.S.C. 154(b) by 99 days.

This patent is subject to a terminal disclaimer.

(21) Appl. No.: 16/417,115

(22) Filed: May 20, 2019

(65) Prior Publication Data
US 2019/0272451 A1    Sep. 5, 2019

Related U.S. Application Data

(63) Continuation of application No. 15/429,769, filed on Feb. 10, 2017, now Pat. No. 10,346,727.
(Continued)

(51) Int. Cl.
*G06K 9/66* (2006.01)
*G06F 16/532* (2019.01)
(Continued)

(52) U.S. Cl.
CPC ............ *G06K 9/66* (2013.01); *G06F 16/532* (2019.01); *G06F 16/5854* (2019.01);
(Continued)

(58) Field of Classification Search
CPC ...... G06K 9/66; G06K 9/4628; G06K 9/6271; G06K 9/726; G06K 9/52; G06K 9/6215;
(Continued)

(56) References Cited

U.S. PATENT DOCUMENTS 9,875,258 B1    1/2018 Hsiao et al.
10,503,775 B1 * 12/2019 Ranzinger ............ G06K 9/6202
(Continued)

FOREIGN PATENT DOCUMENTS

EP    2733629 A1    5/2014

OTHER PUBLICATIONS

Xu, Hao, et al. "Image search by concept map." Proceedings of the 33rd international ACM SIGIR conference on Research and development in information retrieval. ACM, 2010. (Year: 2010).*
(Continued)

*Primary Examiner* — Geoffrey E Summers
(74) *Attorney, Agent, or Firm* — Keller Jolley Preece

(57) ABSTRACT

The present disclosure includes methods and systems for searching for digital visual media based on semantic and spatial information. In particular, one or more embodiments of the disclosed systems and methods identify digital visual media displaying targeted visual content in a targeted region based on a query term and a query area provide via a digital canvas. Specifically, the disclosed systems and methods can receive user input of a query term and a query area and provide the query term and query area to a query neural network to generate a query feature set. Moreover, the disclosed systems and methods can compare the query feature set to digital visual media feature sets. Further, based on the comparison, the disclosed systems and methods can identify digital visual media portraying targeted visual content corresponding to the query term within a targeted region corresponding to the query area.

20 Claims, 13 Drawing Sheets

Related U.S. Application Data

(60) Provisional application No. 62/414,140, filed on Oct. 28, 2016.

(51) Int. Cl.
| | |
|---|---|
| *G06K 9/46* | (2006.01) |
| *G06K 9/62* | (2006.01) |
| *G06K 9/72* | (2006.01) |
| *G06N 3/04* | (2006.01) |
| *G06F 16/583* | (2019.01) |
| *G06K 9/52* | (2006.01) |
| *G06N 3/08* | (2006.01) |

(52) U.S. Cl.
CPC ............ *G06K 9/4628* (2013.01); *G06K 9/52* (2013.01); *G06K 9/6215* (2013.01); *G06K 9/6256* (2013.01); *G06K 9/6267* (2013.01); *G06K 9/6271* (2013.01); *G06K 9/726* (2013.01); *G06N 3/0454* (2013.01); *G06N 3/08* (2013.01); *G06K 2009/4666* (2013.01)

(58) Field of Classification Search
CPC ............... G06K 9/6256; G06K 9/6267; G06K 2009/4666; G06K 6/4628; G06F 16/50; G06F 16/53; G06F 16/532; G06F 16/58; G06F 16/583; G06F 16/5854; G06F 16/5838; G06N 3/02–088
USPC .................. 382/181, 190, 244, 305, 156–158
See application file for complete search history.

(56) References Cited

U.S. PATENT DOCUMENTS

| | | | |
|---|---|---|---|
| 2008/0240572 A1* | 10/2008 | Hoshii | G06F 16/5854 382/190 |
| 2011/0072048 A1* | 3/2011 | Hua | G06F 16/58 707/780 |
| 2012/0072410 A1 | 3/2012 | Wang et al. | |
| 2013/0301938 A1* | 11/2013 | Chen | G06K 9/00221 382/224 |
| 2014/0108016 A1 | 4/2014 | Albrecht | |
| 2016/0027180 A1* | 1/2016 | Iyer | G06T 7/11 382/195 |
| 2017/0249339 A1 | 8/2017 | Lester | |
| 2017/0262479 A1 | 9/2017 | Chester et al. | |
| 2018/0121768 A1 | 5/2018 | Lin et al. | |

OTHER PUBLICATIONS

Li, Mengyou, et al. "Object-layout-aware image retrieval for personal album management." European Conference on Computer Vision. Springer, Berlin, Heidelberg, 2012. (Year: 2012).*
Liu, Cailiang, et al. "Robust semantic sketch based specific image retrieval." 2010 IEEE International Conference on Multimedia and Expo. IEEE, 2010. (Year: 2010).*
Mikolov, Tomas, et al. "Distributed representations of words and phrases and their connpositionality." Advances in neural information processing systems. 2013. (Year: 2013).*
Kottur, Satwik, et al. "Visual Word2Vec (vis-w2v): Learning Visually Grounded Word Embeddings Using Abstract Scenes." arXiv preprint arXiv:1511.07067 (2016). (Year: 2016).*
Intention to Grant as received in United Kingdom Application GB1714053.4 dated May 1, 2020.
Examination Report as received in GB1714053.4 dated Feb. 23, 2018.
Hao Xu, Jingdong Wang, Xian-Sheng Hua, and Shipeng Li. 2010. Image search by concept map. In Proceedings of the 33rd international ACM SIGIR conference on Research and development in information retrieval (SIGIR '10). ACM, New York, NY, USA, 275-282.
Ritendra Datta, et al. 2005. Content-based image retrieval: approaches and trends of the new age. In Proceedings of the 7th ACM SIGMM international workshop on Multimedia information retrieval (MIR '05). ACM, New York, NY, USA, 253-262.
C. Szegedy et al., Going deeper with convolutions, 2015 IEEE Conference on Computer Vision and Pattern Recognition (CVPR), Boston, MA, 2015, pp. 1-9.
J. Deng, W. Dong, R. Socher, L. J. Li, Kai Li and Li Fei-Fei, ImageNet: A large-scale hierarchical image database, Computer Vision and Pattern Recognition, 2009. CVPR 2009. IEEE Conference on, Miami, FL, 2009, pp. 248-255.
Mikolov, Tomas; Sutskever, Ilya; Chen, Kai; Corrado, Greg S.; Dean, Jeff (2013). Distributed representations of words and phrases and their compositionality, NIPS 2013.
Tsung-Yi Lin, Michael Maire, Serge Belongie, Lubomir Bourdev, Ross Girshick, James Hays, Pietro Perona, Deva Ramanan, C. Lawrence Zitnick, Piotr Dollár; "Microsoft COCO: Common Objects in Context," Submitted on May 1, 2014 (v1), last revised Feb. 21, 2015 (this version, v3)), Cornell University Library, arXiv:1405.0312v3 [cs.CV], 15 pages.
Ranjay Krishna, Yuke Zhu, Oliver Groth, Justin Johnson, Kenji Hata, Joshua Kravitz, Stephanie Chen, Yannis Kalantidis, Li-Jia Li, David A. Shamma, Michael S. Bernstein, Li Fei-Fei "Visual Genome: Connecting Language and Vision Using Crowdsourced Dense Image Annotations" Submitted on Feb. 23, 2016, Cornell Univerity Library, https://arxiv.org/abs/1602.07332, 45 pages.
Bai, Yalong, et al. "Bag-of-words based deep neural network for image retrieval." Proceedings of the 22nd ACM international conference on Multimedia. ACM, 2014. (Year: 2014).
Hinami, Ryota, Yusuke Matsui, and Shinichi Satoh. "Region-Based Image Retrieval Revisited." arXiv preprint arXiv:1709.09106 2017). (Year: 2017).
Johnson, Justin, et al. "Image retrieval using scene graphs." Proceedings of the IEEE conference on computer vision and pattern recognition. 2015. (Year: 2015).
Qi, Yonggang, et al. "Sketch-based image retrieval via siamese convolutional neural network." Image Processing (ICIP), 2016 IEEE International Conference on. IEEE, 2016. (Year: 2016).
Quinn, Max H., et al. "Semantic Image Retrieval via Active Grounding of Visual Situations." Semantic Computing (ICSC), 2018 IEEE 12th International Conference on. IEEE, 2018. (Year: 2018).
Karn, Ujjwal. "An Intuitive Explanation of Convolutional Neural Networks." the data science blog. Aug. 11, 2016. https:// ujjwalkarn. nne/2016/08/11/intuitive-explanation-convnets/. (Year: 2016).
Krizhevsky, Alex, Ilya Sutskever, and Geoffrey E. Hinton. "Imagenet classification with deep convolutional neural networks." Advances in neural information processing systems. 2012. (Year: 2016).
Wan, Ji, et al. "Deep learning for content-based image retrieval: A comprehensive study." Proceedings of the 22nd ACM international conference on Multimedia. ACM, 2014. (Year: 2014).
Wei, Yunchao, et al. "Cross-modal retrieval with cnn visual features: A new baseline." IEEE transactions on cybernetics 47.2 (2017) :449-460. (Year: 2016).
Xie, Lingxi, et al. "Image classification and retrieval are one." Proceedings of the 5th ACM on International Conference on Multimedia Retrieval. Acm, 2015. (Year: 2015).
Lei, Yu-Heng, et al. "Where is who: Large-scale photo retrieval by facial attributes and canvas layout." Proceedings of the 35th international ACM SIGIR conference on Research and development in information retrieval. ACM, 2012. (Year: 2012).
Ng, Joe Yue-Hei, Fan Yang, and Larry S. Davis. "Exploiting Local Features from Deep Networks for Image Retrieval." arXiv preprint arXiv:1504.05133 (2015). (Year: 2015).
U.S. Appl. No. 15/429,769, Dec. 13, 2018, Preinterview 1st Office Action.
U.S. Appl. No. 15/429,769, Feb. 21, 2019, Notice of Allowance.

\* cited by examiner

Word Query 102  Word Search Results 102a

Image Query 104  Image Search Results 104a

Spatial-Semantic Query 106  Spatial-Semantic Search Results 106a

UTILIZING A DIGITAL CANVAS TO CONDUCT A SPATIAL-SEMANTIC SEARCH FOR DIGITAL VISUAL MEDIA

CROSS REFERENCE TO RELATED APPLICATIONS

This application is a continuation of U.S. patent application Ser. No. 15/429,769, filed Feb. 10, 2017, which claims the benefit of priority to U.S. Provisional Patent Application No. 62/414,140, filed Oct. 28, 2016. The aforementioned applications are hereby incorporated by reference in their entirety.

BACKGROUND

Recent years have seen rapid technological development in the arena of digital visual media searching. Indeed, as a result of the proliferation of personal computing devices and digital cameras, individuals and businesses now routinely manage large repositories of digital images and digital videos. Accordingly, digital visual media searching has become a ubiquitous need for individuals and businesses in a variety of scenarios ranging from casual users seeking to locate specific moments from a personal photo collection to professional graphics designers sorting through stock images to enhance creative projects.

In response, developers have created a variety of digital searching systems that can search digital visual media. In large part, these conventional digital searching systems fall within two major search paradigms: search by text-based searches (i.e., systems that utilize a keyword to search a repository of digital images) and search by similar image (i.e., systems that utilize an existing digital image to search for similar digital images). Although these conventional digital search systems are capable of identifying digital visual media portraying certain content, they also have a number of shortcomings. For example, although conventional digital search systems are able to identify content in digital images, such conventional digital search systems are unable to efficiently identify digital visual content reflecting a particular spatial configuration.

To illustrate, users often seek to find digital images with a specific visual arrangement of objects. For example, a professional designer may need a digital image portraying a specific object in a particular location for a creative project. Existing digital systems allow users to search for digital images portraying specific content, but cannot accurately identify digital images based on spatial arrangement.

To illustrate this point, FIGS. 1A and 1B illustrate the results of conventional search systems for an image of a person holding a tennis racket on their left. FIG. 1A illustrates the results of a conventional text-based search, while FIG. 1B illustrates the results of a conventional similar image based search. As shown, FIG. 1A illustrates, a word query 102 is limited in its capability to reflect spatial features in a search. Specifically, the word query 102 can describe desired content (i.e., "Tennis Racket"), but fails to provide an avenue for imposing accurate spatial constraints. Indeed, although the word query 102 includes text describing a particular configuration (i.e., "Left"), such a term fails to translate into a meaningful search result. Thus, as shown, the word search results 102a portray digital images that include tennis rackets; however, the spatial configuration of the tennis rackets portrayed within the digital images is haphazard. Accordingly, a user seeking a picture of a person holding a tennis racket to their left will have to sort through the word search results 102a in an attempt to find a digital image that matches the desired spatial arrangement.

Similarly, as shown, the image query 104 is limited in its ability to reflect spatial information in a search. As an initial matter, to search for a digital image of a person holding a tennis racket on their left, the image query 104 requires an image of a person holding a tennis racket on their left. Of course, this imposes a significant inconvenience on the user, inasmuch as the lack of an example digital image is the very reason for conducting a search in the first place. Even assuming, however, that a user already has an image of a person holding a tennis racket on their left to generate the image query 104, the image query 104 fails to adequately incorporate spatial concepts into the search. Indeed, although the image search results 104a generally include tennis rackets and tennis players, the image search results 104 portray tennis rackets in a variety of different spatial configurations. Thus, a user seeking a picture of a person holding a tennis racket to their left will have to sort through the image search results 104a in an attempt to find a digital image that matches the desired spatial arrangement.

As shown, conventional digital search systems generally lack the ability to return accurate search results for images with a particular spatial arrangement of objects.

BRIEF SUMMARY

One or more embodiments of the present disclosure provide benefits and/or solve one or more of the foregoing or other problems in the art with systems and methods that search for and identify digital visual media based on spatial and semantic information. In particular, in one or more embodiments, the disclosed systems and methods utilize user interaction with a digital canvas to determine both spatial and semantic search intent (e.g., a query term indicating targeted visual content and a query area indicating a targeted region for the visual content). Moreover, the disclosed systems and methods conduct a search based on the determined spatial and semantic search intent to retrieve digital images portraying the targeted visual content within the targeted region. Specifically, in one or more embodiments, the disclosed systems and methods develop a deep learning model that generates a representation of semantic and spatial features from one or more query terms and one or more query areas. Moreover, the disclosed systems and methods utilize the features from the deep learning model to search for corresponding digital visual media items having similar features. In particular, the disclosed systems and methods compare a feature representation of a query area and query term with digital image features sets representing a plurality of digital images. In this manner, disclosed systems and methods identify digital visual media items portraying targeted visual content within a targeted region.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

The detailed description is described with reference to the accompanying drawings in which.

DETAILED DESCRIPTION

Figure 1A:
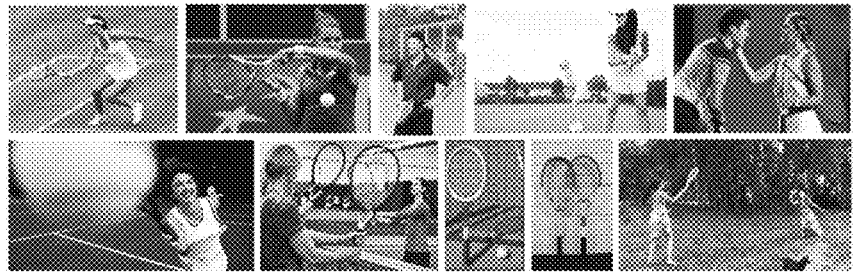
FIG. 1A illustrates the results of a search for a person holding a tennis racket on their left using a conventional textual search.

One or more embodiments of the present disclosure include a spatial-semantic media search system that identifies digital visual media including spatial and semantic characteristics. In particular, in one or more embodiments, the spatial-semantic media search system identifies digital images portraying targeted visual content within a targeted region. For example, in one or more embodiments, the spatial-semantic media search system utilizes a neural network to generate a query feature set from a query term and a query area. Furthermore, the spatial-semantic media search system utilizes the query feature set to search a repository of digital visual media. In particular, the spatial-semantic media search system generates digital images feature sets corresponding digital images utilizing another neural network and compares the query feature set to the digital image feature sets. Based on this comparison, the spatial-semantic media search system identifies digital visual media items portraying targeted content corresponding to a query term within a targeted region corresponding to a query area.

The spatial-semantic media search system provides a number of advantages over conventional digital search systems. As an initial matter, the spatial-semantic media search system determines user intent to search for both semantic and spatial features and provides digital visual media search results that reflect the desired semantic and spatial features. Accordingly, the spatial-semantic media search system quickly and easily searches for and identifies digital visual media items that portray desired spatial and semantic features.

Furthermore, by utilizing deep learning techniques, the spatial-semantic media search system analyzes high-level and low-level features in identifying digital visual media from query terms and query areas. For instance, the spatial-semantic media search system analyzes deep features learned from a trained neural network that effectively capture high-level concepts as well as low-level pixel similarities. This results in more accurate and robust results as compared with conventional digital search systems.

To illustrate, conventional digital search systems often struggle with the problem of semantic gap. Semantic gap refers to the difference in meaning between representation systems, such as the difference in meaning between low-level digital representations of visual media (e.g., pixels in a digital image) and high-level concepts portrayed by digital visual media (e.g., an object or environment portrayed by a digital image). Conventional digital search systems are generally more accurate in identifying digital visual media items with similar low-level features (e.g., pixels with red colors), but have difficulty identifying similarity in high-level features (e.g., distinguishing between a red sock and red pants). By utilizing deep learning techniques to train a query neural network, the spatial-semantic media search system compares both high-level and low-level features and bridges the semantic gap.

Furthermore, by utilizing a query neural network, the spatial-semantic media search system can directly generate a feature representation (e.g., a feature set) from a query utilizing a query neural network and compare the generated feature representation with a repository of digital visual media items. Because the spatial-semantic media search system provides an end-to-end trainable framework, it allows the spatial-semantic media search system to operate more flexibly and to more easily generalize searches and concepts portrayed in digital visual media.

For example, some conventional systems rely on text-based searches of a database (e.g., text search of labeled objects portrayed in a sample image database with corresponding feature sets) to identify visual features. Such an approach limits the robustness of the resulting search. Indeed, such an approach is limited to the particular set of samples within the sample image database. In contrast, the spatial-semantic media search system utilizes a query neural network that directly generates a feature set. The result is a more flexible approach that can generalize high-level concepts and features in conducting a search, and that is not dependent on particular samples identified in a database.

Furthermore, as outlined in greater detail below, by utilizing a query neural network, the spatial-semantic media search system can directly optimize retrieval performance. This improves both user experience and performance of computer devices operating the spatial-semantic media search system. In particular, in one or more embodiments, the spatial-semantic media search system trains the query neural network utilizing an objective loss function that optimizes performance of the query neural network. In particular, the spatial-semantic media search system utilizes a loss function to train the query neural network to generate feature sets that reduce similarity loss and that increase differentiation in relation to irrelevant visual media and terms. The result is a query neural network that can identify targeted visual content within targeted regions more accurately, more quickly, and with fewer computing resources (e.g., fewer resources to train and utilize the query neural network).

Turning now to the figures, additional detail will be provided regarding searching for digital visual media in accordance with one or more embodiments. As used herein, the term "digital visual media" (or "digital visual media items") refers to any digital item capable of producing a visual representation. For instance, the term "digital visual media item" includes digital images and digital video. As used herein, the term "digital image" refers to any digital symbol, picture, icon, or illustration. For example, the term "digital image" includes digital files with the following file extensions: JPG, TIFF, BMP, PNG, RAW, or PDF. Similarly, as used herein, the term "digital video" refers to a digital sequence of images. For example, the term "digital video" includes digital files with the following file extensions: FLV, GIF, MOV, QT, AVI, WMV, MP4, MPG, MPEG, or M4V. Although many examples herein are described in relation to digital images, the disclosed embodiments can also be implemented in relation to any digital visual media item.

Figure 1B:
FIG. 1B illustrates the results of a search for a person holding a tennis racket on their left using a conventional similar image search.
Figure 1B:
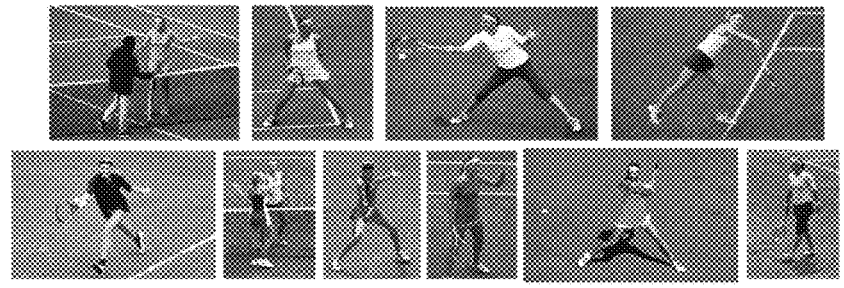
Figure 1C:
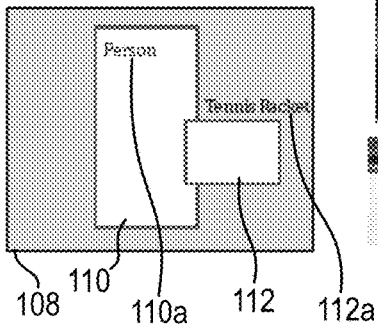
FIG. 1C illustrates the results of a search for a person holding a tennis racket on their left using a spatial-semantic search in accordance with one or more embodiments.
Figure 1C:
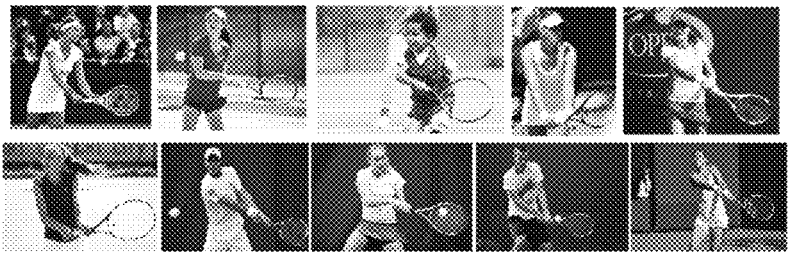

Referring to FIG. 1C, illustrates one example of search results of the spatial-semantic media search system of the present disclosure. Specifically, FIG. 1C, similar to FIGS. 1A and 1B, illustrates an embodiment in which a user seeks to find an image of a person holding a tennis racket on their left. As shown in FIG. 1C, a user generates a spatial-semantic query 106 that includes both spatial information and semantic information for searching for a digital image including targeted visual content within targeted regions. To illustrate, FIG. 1C shows that the spatial-semantic query 106 comprises a digital canvas 108, a first query area 110 corresponding to a first query term 110a (i.e., person), and a second query area 112 corresponding to a second query term 112a (i.e., tennis racket). The digital canvas 108 allows users to convey a search interest in terms of both semantic information (i.e., the query terms 110a, 112a) and spatial information (i.e., the query areas 110, 112).

As used herein, the term "targeted digital image" (or targeted visual media) refers to a digital image (or visual media item) that satisfies search parameters. In particular, a "targeted digital image" includes a desired digital image for which a user is seeking (i.e., that satisfies a user's desired search parameters). For example, in relation to FIG. 1C, a user seeks an image that portrays a person holding a tennis racket to their left. Accordingly, a targeted digital image in relation to FIG. 1C is a digital image portraying a person holding a tennis racket to their left.

As used herein, the term "targeted visual content" refers to a desired representation portrayed in digital visual media. In particular, the term "targeted visual content" refers to a visual representation that a user desires in a targeted digital image. For example, targeted visual content can include a desired object, a desired action, or any other desired visual representation. To illustrate, with regard to FIG. 1C, the targeted visual content is a person and a tennis racket. In relation to the spatial-semantic media search system, query term can indicate targeted visual content.

As used herein, "query term" refers to a word or phrase used to express a desired concept. In particular, "query term" includes a word or phrased used to express targeted visual content in a targeted digital image. In other words, in one or more examples, a query term refers to an object in an image to be identified. A query term can include any word or phrase, including, for example, nouns, verbs, adverbs, or adjectives. Thus, a "query term" can include a term indicating an object (e.g., the term "car"), an action (e.g., the term "speeding"), a descriptor (e.g., the term "red"), a qualifier (e.g., the term "dangerously") or any combination thereof (e.g., the phrase "red car speeding dangerously"). For instance, in relation to FIG. 1, the query term 110a comprises "person" and the query term 112a comprises "tennis racket."

As used herein, the term "targeted region" refers to an area of a digital image. In particular, the term "targeted region" includes an area of a digital image that includes targeted visual content. For example, the "targeted region" for the spatial-semantic search of FIG. 1C for the person is the middle of the digital image. In relation to the spatial-semantic media search system, a user can express a targeted region utilizing a query area.

As used herein, the term "query area" refers to an indicated region of a digital item. In particular, the term "query area" refers to a region of a digital canvas. For instance, "query area" include a region of a digital canvas indicating a targeted region in a targeted digital image. More particularly, the term "query area" includes a region of a digital canvas indicting a targeted region portraying targeted visual content. A query area can comprise any variety of shapes or area types. For example, a query area can comprise a circle, square, rectangle, triangle, or other shape. Similarly, a query area can include a sketch, drawing, or other irregular boundary or shape. In relation to FIG. 1C, the query area 110 is a rectangle within the digital canvas 108 indicating the region in which the user desires a person to be located.

Moreover, as used herein, the term "digital canvas" refers to a digital area in which a user can indicate or input a query area and/or query term. In particular, the term "digital canvas" includes a graphical user interface element comprising a visual representation of a targeted digital image for input of a query area indicating a targeted region and query term indicating targeted visual content. For example, a digital canvas includes a digital, two-dimensional representation of a field that a user can interact with to provide user input of a query area and/or query term. Thus, in relation to FIG. 1C, the digital canvas 108 comprises a field for entry of the query terms 110a, 112a and the query areas 110, 112. In one or more embodiments, a digital canvas 108 can have a size/shape corresponding to a digital image or other digital visual media.

As shown in FIG. 1C, the spatial-semantic media search system conducts a search based on the digital canvas 108. In particular, the spatial-semantic media search system conducts a search based on the first query area 110, the first query term 110a, the second query area 112, and the second query term 112a to identify digital images. More specifically, the spatial-semantic media search system conducts a search to identify digital images portraying targeted visual content corresponding to the first query term 110a within a targeted region corresponding to first query area 110 and targeted visual content corresponding to the second query term 112a within a targeted region corresponding to the second query area 112. Thus, as shown, the spatial-semantic search results 106a comprise digital images with a person holding a tennis racket to their left. In particular, the digital images in the spatial-semantic search results 106a portray a person within a first targeted region corresponding to the first query area 110 and a tennis racket within a second targeted region corresponding to the second query area 112.

Accordingly, a user designing a particular page layout (i.e., a page layout that needs a tennis player holding a tennis racket to their left) can simply provide user input via the digital canvas 108 of the first query area 110, the first query term 110a, the second query area 112, and the second query term 112a. In response, the spatial-semantic media search system can identify and provide for display a plurality of digital images that match the requested semantic and spatial features.

Figure 2:
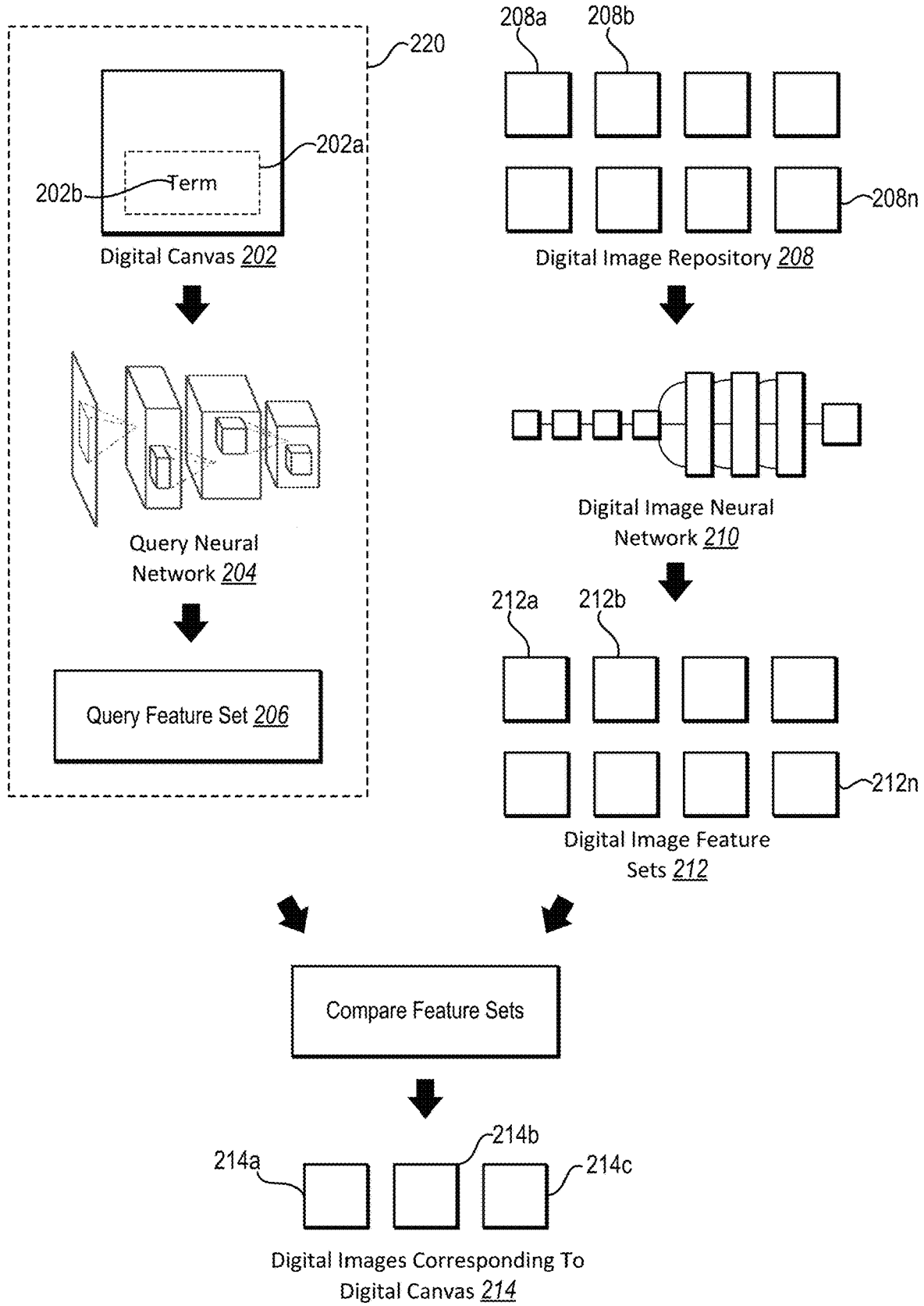
FIG. 2 illustrates a representation of identifying digital visual media utilizing a trained query neural network and a step for generating a query feature set using a query neural network in accordance with one or more embodiments.

As mentioned above, in one or more embodiments, the spatial-semantic media search system selects digital images corresponding to a query area and query term of a digital canvas by utilizing a query neural network and a digital image neural network. In particular, the spatial-semantic media search system generates a query feature set based on a digital canvas by providing the digital canvas to a query neural network. Similarly, the spatial-semantic media search system generates digital image feature sets by providing digital images to a digital image neural network. Moreover, the spatial-semantic media search system can compare the query feature set and the digital image feature sets to select digital images corresponding to the digital canvas. For example, FIG. 2 illustrates a representation of identifying digital images based on a query neural network and a digital image neural network in accordance with one or more embodiments.

As used herein, the term "query neural network" refers to a neural network that generates a feature set based on a spatial and semantic information. In particular, the term "query neural network" includes a convolutional neural network that generates a query feature set based on a query term and a query area. Additional detail regarding example embodiments of a query neural network are provided below.

As used herein, the term "digital image neural network" refers to a neural network that generates a feature set based on a digital image. In particular, the term "digital image neural network" includes a convolutional neural network that generates a digital image feature set based on providing a digital image as input to the convolutional neural network. The spatial-semantic media search system can also utilize a digital media neural network that generates a feature set based on a digital media item (e.g., generates a feature set based on one or more representative frames of a digital video). Additional detail regarding example embodiments of a digital image neural network are provided below.

As used herein, the term "query feature set" refers to a digital item generated by a query neural network based on a query term and a query area. In particular, the term "query feature set" can include one or more feature vectors generated by a convolutional neural network that reflect spatial and semantic information. For example, a query feature set can include a feature set generated by a layer of a convolutional neural network that reflects a representation of features corresponding to a query term and a query area. For example, the query feature set can include a collection of feature vectors that reflect a query term and a query area, wherein the query feature set has the same dimensionality as a digital image feature set.

Moreover, as used herein, the term "digital image feature set" refers to a digital item generated by a digital image neural network based on a digital image. In particular, the term "digital image feature set" includes one or more feature vectors generated by a convolutional neural network that reflect features of the digital image. For example, a query feature set can include a feature set generated by a layer of a convolutional neural network that reflects semantic information and spatial information from the digital image (e.g., a feature set at a high-level layer of a convolutional neural network as opposed to a fully-connected layer). For example, the digital image feature set can include a collection of feature vectors that reflect a digital image, wherein the digital image feature set has the same dimensionality as a query feature set.

To illustrate, FIG. 2 shows a representation of identifying digital images corresponding to a digital canvas utilizing a query neural network and a digital image neural network. In particular, FIG. 2 illustrates a digital canvas 202 comprising a query area 202a and a corresponding query term 202b. Moreover, FIG. 2 illustrates a digital image repository 208 comprising a plurality of digital images 208a-208n. Based on the digital canvas 202, the spatial-semantic media search system conducts a search of the digital image repository 208 for digital images portraying the query term 202b within the query area 202a.

In particular, as shown in FIG. 2, the spatial-semantic media search system performs a step 220 for generating a query feature set from the query area and the query term using a query neural network. As outlined in FIG. 2 and in the description below, the spatial-semantic media search system performs the step 220 by providing the digital canvas 202 to a query neural network 204 to generate a query feature set 206.

The spatial-semantic media search system provides the digital images 208a-208n of the digital image repository 208 to a digital image neural network 210 to generate a plurality of digital image feature sets 212a-212n. Further, the spatial-semantic media search system compares the query feature set 206 and the plurality of digital image feature sets 212a-212n to identify digital images 214a-214c corresponding to the digital canvas 202.

In relation to the embodiment of FIG. 2, the digital canvas 202 comprises the query area 202a and the query term 202b, which indicate a targeted region and targeted visual content, respectively. As mentioned above, the digital canvas 202 can comprise any number or type of query areas and corresponding query terms. For example, rather than a single query term and a single query area, the digital canvas 202 can comprise multiple query terms and multiple query areas.

As shown in FIG. 2, the spatial-semantic media search system provides the digital canvas 202 to the query neural network 204 (i.e., as part of the step 220 for generating a query feature set from the query area and the query term using a query neural network). In particular, the spatial-semantic media search system provides the digital canvas 202 to the query neural network 204 by generating a representation of the query area 202a and the query term 202b. Specifically, the spatial-semantic media search system represents the digital canvas 202 as a three-dimensional grid and provides the three-dimensional grid as input to the trained query neural network 204.

For instance, the spatial-semantic media search system converts the query term 202b to a query term vector utilizing a word to vector algorithm. Moreover, the spatial-semantic media search system then populates elements (e.g., spatial locations) of the three-dimensional grid corresponding to the query area 202a with the query term vector. To illustrate, although the spatial-semantic media search system can generate a three-dimensional grid of a variety of different sizes, in one or more embodiments, the spatial-semantic media search system generates a 31×31×300 three-dimensional grid that represents the digital canvas. Additional detail regarding generating a three-dimensional grid is provided below in relation to FIG. 3.

As shown in FIG. 2, as part of the step 220, the spatial-semantic media search system utilizes the query neural network 204 to generate the query feature set 206 based on the digital canvas 202. In particular, the query neural network 204 of FIG. 2 is a convolutional generative model (i.e., a convolutional neural network). In particular, the query neural network 204 is a convolutional neural network that utilizes input of a three-dimensional grid (e.g., a 31×31×300 three-dimensional grid) and produces a query feature set as output. Specifically, the spatial-semantic media search system generates a query feature set of similar dimensionality to digital image feature sets (e.g., a 7×7×832 feature set).

The spatial-semantic media search system utilizes a query neural network having a variety of forms to generate query feature sets. In relation to the embodiment of FIG. 2, and as part of the step 220, the query neural network 204 includes a convolutional generative model with three convolutional layers interleaved by two max pooling and two subsampling layers. In particular, Table 1 includes the detailed architecture of the query neural network 204 in relation to the embodiment of FIG. 2.

TABLE 1

| Layer | Type | Number of features | Receptive Field | Stride |
|---|---|---|---|---|
| 1 | Convolution | 256 | 3 × 3 | 1 |
| 2 | Max-Pooling | 256 | 2 × 2 | 2 |
| 3 | Convolution | 512 | 3 × 3 | 1 |
| 4 | Max-Pooling | 512 | 2 × 2 | 2 |
| 5 | Convolution | 832 | 2 × 2 | 1 |

In addition to utilizing the query neural network 204 to generate the query feature set 206, as shown in FIG. 2, the spatial-semantic media search system also utilizes the digital image neural network 210 to generate the digital image feature sets 212a-212n. In particular, the spatial-semantic media search system provides the plurality of digital images 208a-208n to the digital image neural network 210 to generate the digital image feature sets 212a-212n.

In relation to FIG. 2, the digital image neural network 210 comprises a deep convolutional neural network. Specifically, the digital image neural network 210 comprises a deep convolutional neural network with a plurality of layers (e.g., high-level convolution layers, max pooling layers, and fully-connected layers). For example, in one or more embodiments the digital image neural network 210 comprises the convolutional neural network, GoogLeNet as described in C. Szegedy et al., Going deeper with convolutions, 2015 IEEE Conference on Computer Vision and Pattern Recognition (CVPR), Boston, Mass., 2015, pp. 1-9, the entire contents of which are hereby incorporated by references.

GoogLeNet is a convolutional neural network with a specific architecture. In particular, GoogLeNet generally comprises a stem, a plurality of inception modules, and an output classifier. The stem comprises a sequential chain of convolution, pooling, and local response normalization operations. The inception modules each comprise a set of convolution and poolings at different scales, each done in parallel, then concatenated together. For example, in one embodiment, GoogLeNet utilizes 22 inception modules. The output classifier performs an average pooling operation followed by a fully connected layer.

In one or more embodiments, the spatial-semantic media search system utilizes the digital image neural network 210 to generate the digital image feature sets 212a-212n by utilizing a feature set generated at a high-level layer within the digital image neural network 210. For example, in one or more embodiments, the digital image neural network 210 is trained to predict object classifications portrayed in a digital image. In one or more embodiments, rather than obtaining a classification from the digital image neural network, the spatial-semantic media search system obtains a feature set from a layer of the digital image neural network and utilizes the feature set as one of the digital image feature sets 212a-212n.

More specifically, as described above, in one or more embodiments the digital image neural network 210 comprises a plurality of high-level convolution layers, max-pooling layers, and fully-connected layers. The high-level convolution layers within the digital image neural network tend to preserve both spatial information (i.e., information regarding arrangement of objects in the digital image) and semantic information (i.e., information regarding classifying or labeling objects in the digital image), as opposed to fully-connected layers, which become focused on semantic information for classifying the objects portrayed in the digital image. Accordingly, in one or more embodiments, the spatial-semantic media search system utilizes a feature set determined at a high-level convolution layer that preserves both spatial information and semantic information. To illustrate, in relation to FIG. 2, the spatial-semantic media search system utilizes a feature set from the fourth inception module of the GoogLeNet architecture to generate the digital image feature sets 212a-212n.

In one or more embodiments, the spatial-semantic media search system also trains a digital image neural network. For example, in relation to FIG. 2, the spatial-semantic media search system trains the digital image neural network 210 utilizing a set of training digital images with one or more known classifications (e.g., known objects portrayed in the digital image). The spatial-semantic media search system provides the set of training digital images to the digital image neural network 210 and the digital image neural network 210 generates predicted classifications of the training digital images (e.g., attempt to classify objects portrayed in the training digital images). The spatial-semantic media search system trains the digital image neural network 210 by comparing the predicted classification with the actual classification of the objects portrayed in the digital image. Although the spatial-semantic media search system can utilize any variety of training digital images or training digital image repositories, with regard to the embodiment of FIG. 2, the spatial-semantic media search system trains the digital image neural network 210 by providing the digital image neural network with the ImageNet image dataset—see J. Deng, W. Dong, R. Socher, L. J. Li, Kai Li and Li Fei-Fei, ImageNet: A large-scale hierarchical image database, Computer Vision and Pattern Recognition, 2009. CVPR 2009. IEEE Conference on, Miami, Fla., 2009, pp. 248-255, the entire contents of which are hereby incorporated by reference.

As shown in FIG. 2, upon generating the digital image feature sets 212a-212n and the query feature set 206, the spatial-semantic media search system compares the query feature set and the digital image feature sets 212a-212n to identify digital images corresponding to the digital canvas 202. In particular, the spatial-semantic media search system compares the feature sets by determining a distance between the query feature set and the digital image feature sets 212a-212n. Specifically, with regard to the embodiment of FIG. 2, the feature sets comprise feature vectors. Accordingly, the spatial-semantic media search system compares the feature sets by determining a cosine distance between the feature vectors.

Based on the comparison between the query feature set 206 and the plurality of digital image feature sets 212a-212n, the spatial-semantic media search system identifies the digital images 214a-214c corresponding to the digital canvas 202. In particular, the spatial-semantic media search system identifies the digital images 214a-214c that portray visual content corresponding to the query term 202b within a region corresponding to the query area 202a. To illustrate, the spatial-semantic media search system ranks digital images based on the comparison between the query feature set 206 and the plurality of digital image feature sets 212a-212n (e.g., ranks the digital images based on distance between the query feature set and the corresponding digital image feature sets). Moreover, the spatial-semantic media search system provides the top ranked digital images 214a-214c for display (e.g., the top percentage or the top number of digital images). Additional detail regarding a graphical user interface for providing digital image search results for display is provided below in relation to FIGS. 5A-5C.

Figure 3:
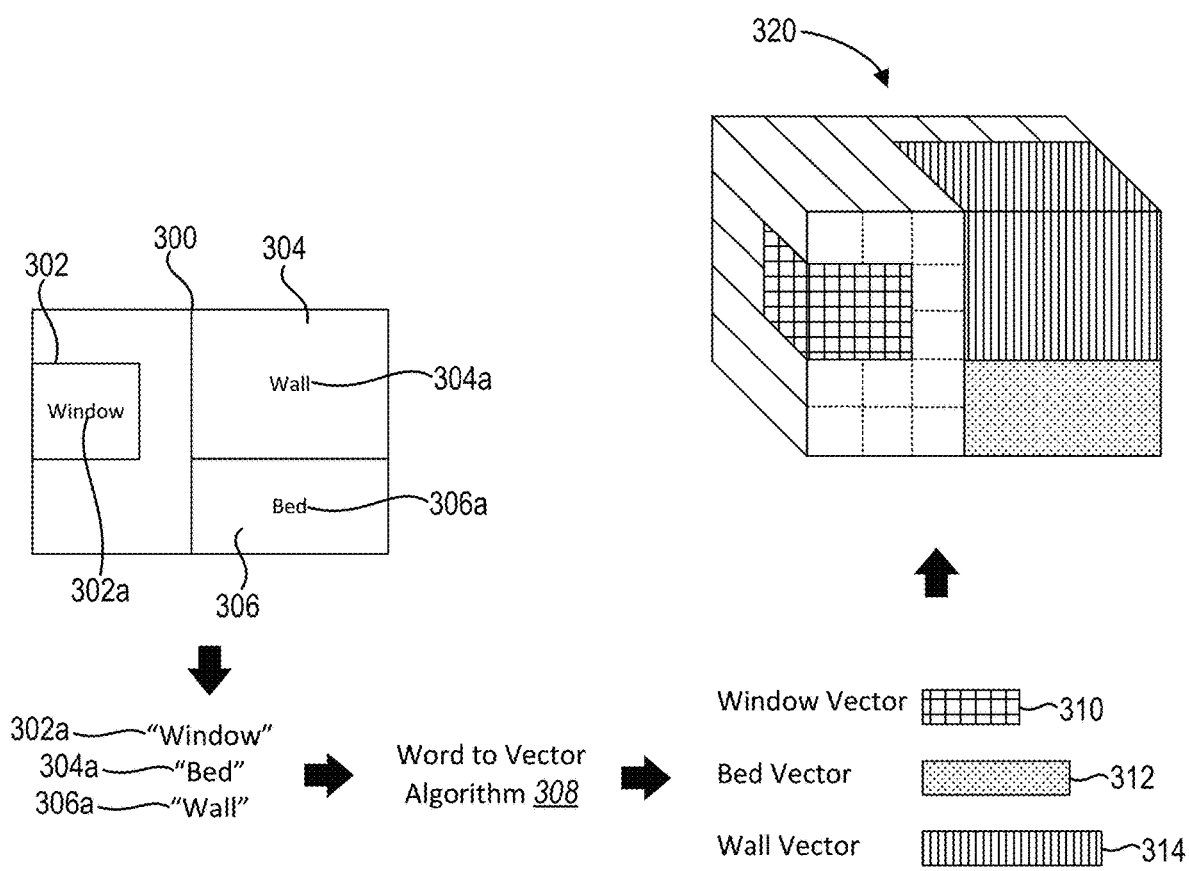
FIG. 3 illustrates a representation of generating a representation of query terms and query areas in a digital canvas in accordance with one or more embodiments.

Turning now to FIG. 3, additional detail will be provided regarding generating a representation of a digital canvas in accordance with one or more embodiments. Indeed, as discussed above, in one or more embodiments, the spatial-semantic media search system generates a representation of a query term and a query area to provide to a query neural network. FIG. 3 illustrates generating a representation of a query area and a query term from a digital canvas. In particular, FIG. 3 illustrates a digital canvas 300 comprising a first query area 302 with a first query term 302a (i.e., "window"), a second query area 304 with a second query term 304a ("wall"), and a third query area 306 with a third query term 306a ("bed").

As shown, the spatial-semantic media search system extracts the query terms 302a, 304a, 306a from the digital canvas 300 and applies a word to vector algorithm 308. A word to vector algorithm generates a vector representation with regard to linguistic context of one or more terms. In particular, a word to vector algorithm is trained to generate a vector from words or phrases, where the resulting vector indicates linguistic context of words or phrases. For example, a word to vector algorithm can take as training input a training repository of text and map each word to a high-dimensional space. Specifically, the word to vector algorithm assigns each word in the training repository of text to a corresponding vector in the high-dimensional space. The word to vector algorithm positions the word vectors in the space such that words with similar linguistic context/meaning are located in close proximity within the space. Accordingly, a word to vector algorithm can generate vectors that reflect linguistic meaning of one or more input terms. The spatial-semantic media search system can utilize any variety of word to vector algorithms. In relation to FIG. 3, the spatial-semantic media search system utilizes "Word2vec" as the word to vector algorithm 308 as described in Mikolov, Tomas; Sutskever, Ilya; Chen, Kai; Corrado, Greg S.; Dean, Jeff (2013). Distributed representations of words and phrases and their compositionality, NIPS 2013, the entire contents of which are hereby incorporated by reference.

As shown, the spatial-semantic media search system applies the word to vector algorithm 308 to the query terms 302a, 304a, 306a and generates a first query term vector 310, a second query term vector 312, and a third query term vector 314. As used herein, the term "query term vector" refers to a vector representation of a word. In particular, the term "query term vector" include a vector representation of a linguistic meaning of a query term. Accordingly, the first query term vector 310 comprises a vector representation of the linguistic meaning of the query term 302a. Similarly, the second query term vector 312 comprises a vector representation of the linguistic meaning of the query term 304a and the third query vector term 314 comprises a vector representation of the linguistic meaning of the query term 306a.

Upon generating the query term vectors 310-314, the spatial-semantic media search system encodes the query term vectors in a three-dimensional grid 320. As used herein, the term "three-dimensional grid" refers to a digital item reflecting three variables. Accordingly, the term "three-dimensional grid" includes a matrix, database, or spreadsheet that comprises data reflecting three variables. For example, a three-dimensional grid includes a matrix with data representing a position in a first direction, a position in a second direction, and a query term vector. To illustrate, a three-dimensional grid can include a matrix with query term vector values embedded in relation to a spatial location of a digital canvas.

For instance, FIG. 3 illustrates the three-dimensional grid 320 in the form of a three-dimensional matrix, where two-dimensions correspond to x-position and y-position (i.e. a spatial position) of the digital canvas 300 and a third-dimension corresponds to values of query term vectors. Specifically, the spatial-semantic media search system generates the three-dimensional grid 320 by mapping the query term vectors 310-314 to the spatial positions of the corresponding query areas 302-306. Thus, the spatial-semantic media search system maps the first query term vector 310 to spatial positions corresponding to the first query area 302, maps the query term vector 312 to the second query area 304, and maps the third query term vector 314 to the third query area 306. Accordingly, the three-dimensional grid 320 is a digital representation of both the query areas 302-306 and the query terms 302a-306a.

Although FIG. 3 illustrates the three-dimensional grid 320 having a certain structure (e.g., seven columns and five rows), the spatial-semantic media search system can generate a three-dimensional grid having a variety of different structures. For example, in one or more embodiments, the spatial-semantic media search system generates a three-dimensional grid comprising a 31×31×300 canvas representation. Moreover, as described above, the spatial-semantic media search system can provide the 31×31×300 canvas representation to a query neural network to produce a 7×7×832 feature set, which is the dimensionality of feature sets generated by GoogLeNet to represent digital images.

As mentioned above, in addition to utilizing a query neural network, in one or more embodiments, the spatial-semantic media search system also trains a query neural network. In particular, the spatial-semantic media search system trains a query neural network to generate a query feature set based on a representation of a digital canvas. Specifically, in one or more embodiments, the spatial-semantic media search system trains a query neural network by providing a plurality of training terms and training areas corresponding to a plurality of training digital images. The query neural network generates predicted feature sets based on the training terms and the training areas. Moreover, the spatial-semantic media search system trains the query neural network utilizing a training structure that compares the predicted feature sets with actual feature sets corresponding to the training digital images.

As used herein, the term "training digital image" refers to a digital image utilized to train a neural network. In particular, a training digital image includes a digital image that portrays known visual content in a particular region of the digital image (e.g., an identified object having a known object mask within the digital image). As outline below, the spatial-semantic media search system can utilize the known visual content and the region to train the neural network. In particular, the spatial-semantic media search system can identify a training term and a training area and provide the training term and the training area to the query neural network. Moreover, the spatial-semantic media search system can utilize a feature set corresponding to the training digital image to train the neural network to predict more accurate feature sets.

As used herein, the term "training area" refers to a region provided to a neural network to train the neural network. In particular, the term "training area" refers to a region of a training digital image containing known visual content. For example, the term "training area" includes an object mask or other boundary corresponding to visual content (e.g., an object) portrayed in a training digital image.

In addition, as used herein, the term "training term" refers to a word or phrase describing visual content of a training digital image. In particular, the term "training term" includes a word or phrase describing visual content that falls within a training area of a training digital image. Thus, for example, in relation to a training digital image portraying a car, the spatial-semantic media search system can identify a training term (i.e., "car") and a training region (i.e., a region of the training digital image that includes the car).

Figure 4A:
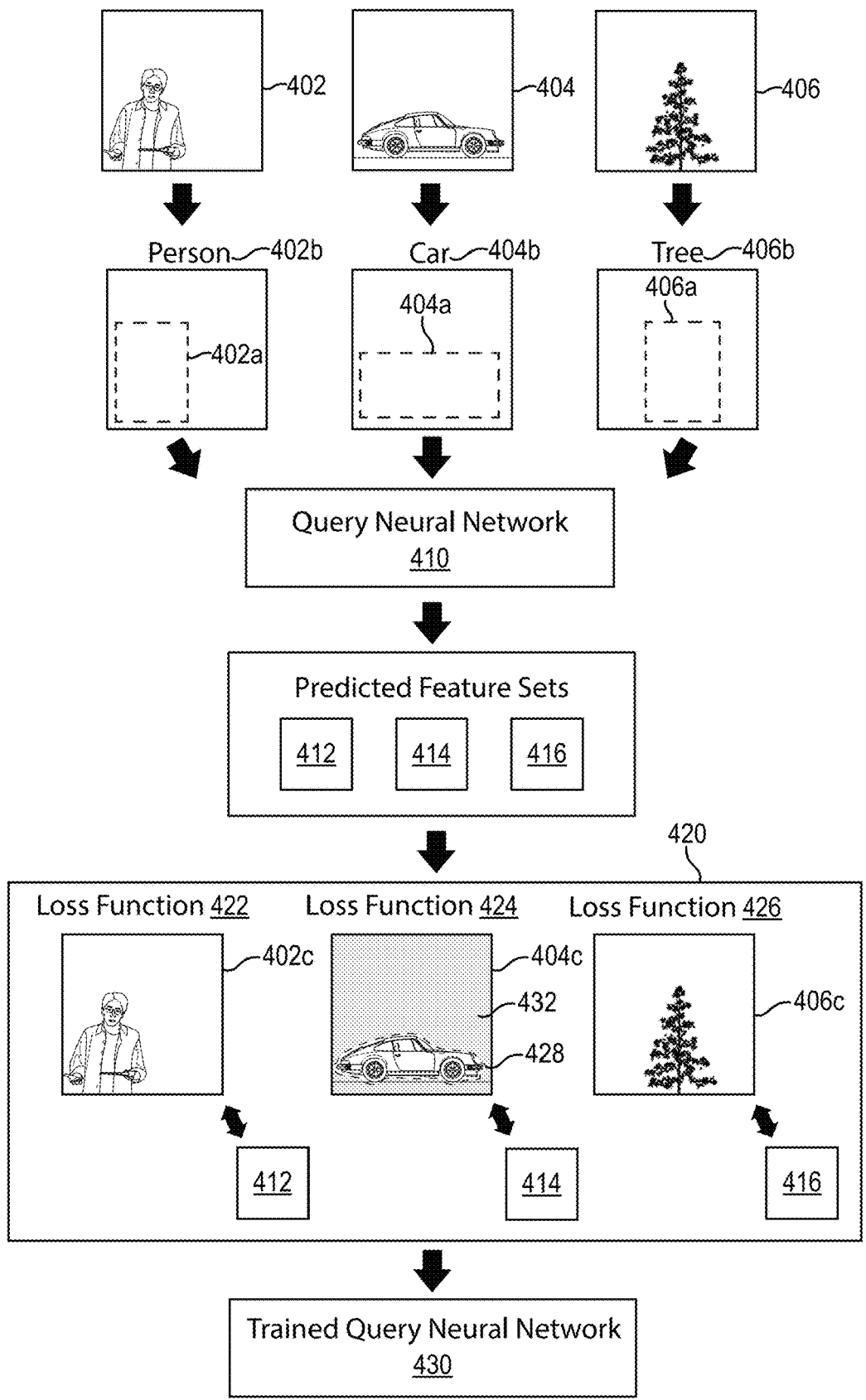
FIGS. 4A-4B illustrate training a query neural network in accordance with one or more embodiments.
Figure 4B:
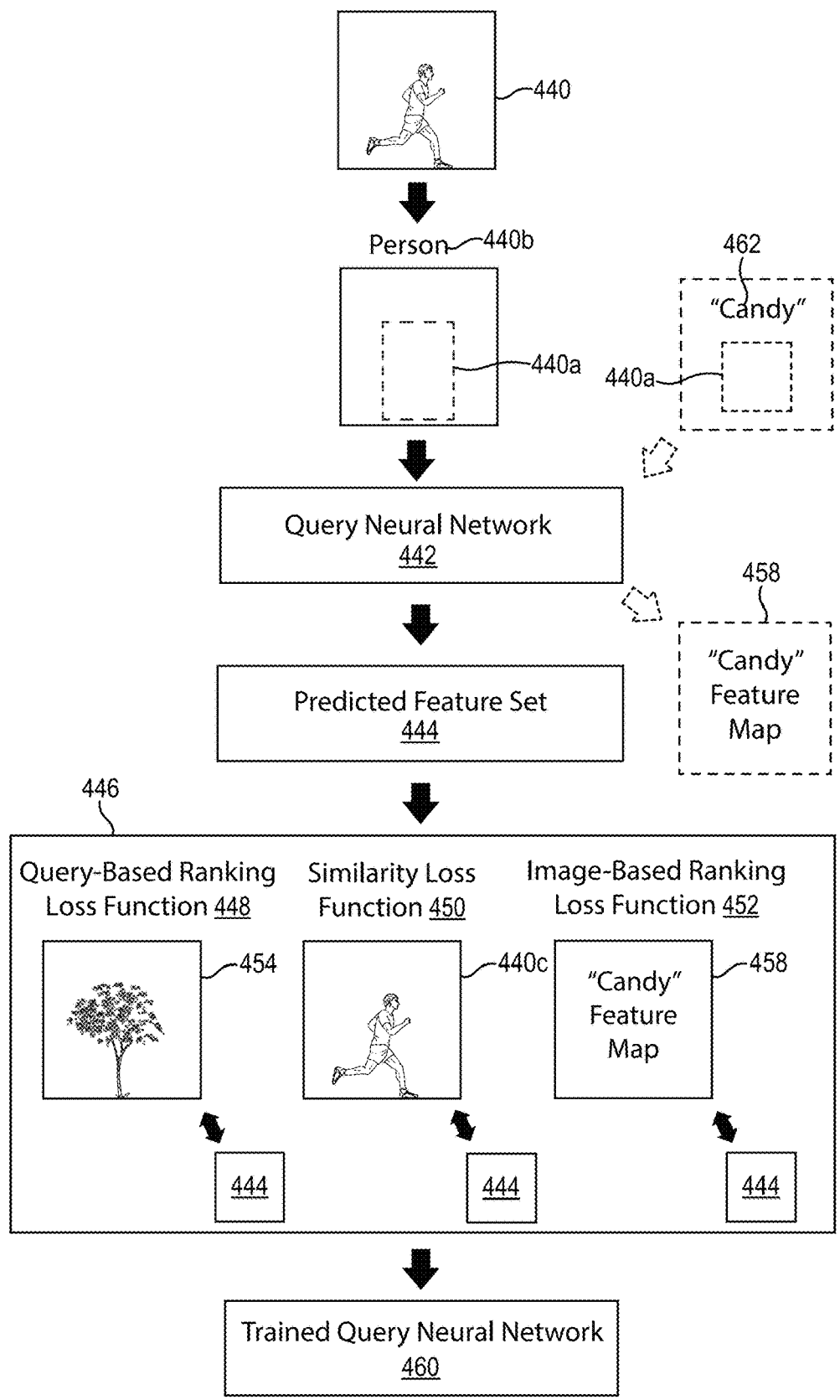

For example, FIGS. 4A-4B illustrate training a query neural network in accordance with one or more embodiments of the spatial-semantic media search system. In particular, FIG. 4A illustrates a first training area 402a corresponding to a first training term 402b, a second training area 404a corresponding to a second training term 404b, and a third training area 406a corresponding to a third training term 406b. Each of the training areas 402a-406a and the training terms 402b-406b correspond to visual content of training digital images 402-406. For example, the training area 402a and the training term 402b correspond to the training digital image 402 portraying a person within the training area of the training digital image 402.

The spatial-semantic media search system obtains the training digital images 402-406 from a repository of training digital images. In particular, the spatial-semantic media search system accesses a repository of training digital images and selects the training digital images 402-406 together with information indicating objects portrayed in the training digital images 402-406 and location of the objects portrayed in the training digital images 402-406. The spatial-semantic media search system then generates the training terms 402b-406b and the training areas 404a-406a based on the information indicating the objects portrayed in the digital images and the location of the objects portrayed.

Moreover, each of the training digital images has a corresponding training digital image feature set. For example, the first training area 402a and the first training term 402b (i.e., "person") correspond to a first feature set 402c of the first training digital image 402. Similarly, the second training area 404a and the second training term 404b ("car") correspond to a second feature set 404c of a second training digital image 404.

The spatial-semantic media search system obtains or generates the digital image feature sets 402c-406c. For example, in one or more embodiments, the spatial-semantic media search system accesses a repository of digital images that already includes the feature sets 402c-406c. In other embodiments, the spatial-semantic media search system generates the feature sets 402c-406c (e.g., by providing the training digital images 402-406 to a digital image query network).

As shown in FIG. 4A, the spatial-semantic media search system provides the training areas 402a-406a and the training terms 402b-406b to a query neural network 410 (e.g., the query neural network 204 described above). Similar to utilizing a query neural network to generate a query feature set, in training a query neural network, the spatial-semantic media search system can generate a representation of a training area and a training term and provide the representation of the training area and the training term to the query neural network. For instance, the spatial-semantic media search system can generate a three-dimensional grid (e.g., the three-dimensional grid 320) corresponding to each training area and corresponding training term and provide the three-dimensional grid to a query neural network.

For example, in relation to FIG. 4A, the spatial-semantic media search system generates a three-dimensional grid corresponding to the first training area 402a and the first training term 402b. Specifically, the spatial-semantic media search system converts the first training term 402b to a training term vector utilizing a word to vector algorithm. The spatial-semantic media search system then encodes the training term vector to a spatial area of a three-dimensional grid corresponding to the training area 402a. The spatial-semantic media search system then provides the three-dimensional grid to the query neural network 410. The spatial-semantic media search system can similarly generate and provide representations of the remaining training areas and training terms.

Furthermore, as shown in FIG. 4A, upon receiving a training area and training term (i.e., a representation of the training area and training term) the spatial-semantic media search system utilizes the query neural network 410 to generate predicted feature sets. In particular, the spatial-semantic media search system utilizes the query neural network 410 to generate a first predicted feature set 412, a second predicted feature set 414, and a third predicted feature set 416 corresponding to the training areas 402a-406a and the training terms 402b-406b. Specifically, the spatial-semantic media search system generates the predicted feature sets 412-416 such that they have the same dimensionality as the feature sets 402c-406c corresponding to the training digital images 402-406. To illustrate, the spatial-semantic media search system generates the predicted feature sets 412-416 with a dimensionality of 7×7× 832 corresponding to feature sets 402c-406c of the training digital images, which also have a dimensionality of 7×7× 832.

Upon generating the predicted feature sets 412-416, the spatial-semantic media search system utilizes the feature sets 402c-406c corresponding to the training digital images 402-406 to train the query neural network. In particular, FIG. 4A illustrates a training structure 420 that utilizes the predicted feature sets 412-416 to generate a trained query neural network 430. Specifically, the training structure 420 comprises a first loss function 422, a second loss function 424, and a third loss function 426.

As shown, each loss function 422-426 compares predicted feature sets with the actual feature sets corresponding to each training digital image. For example, in relation to the first loss function 422 the spatial-semantic media search system compares the predicted feature set 412 and the first feature set 402c corresponding to the first training digital image 402. Similarly, in relation to the second loss function 424, the spatial-semantic media search system compares the second predicted feature set 414 and the second feature set 404c corresponding to the second training digital image 404.

The spatial-semantic media search system compared the predicted feature sets 412-416 to the feature sets 402c-406c utilizing a variety of loss functions. For instance, in one or more embodiments, the spatial-semantic media search system utilizes a loss function (i.e., minimizes a loss function) that compares the distance between the predicted feature sets 412-416 and the feature sets 402c-406c. To illustrate, in relation to the embodiment of FIG. 4A, the predicted feature sets 412-416 and the feature sets 402c-406c comprise feature vectors; accordingly, the spatial-semantic media search system compares the predicted feature sets 412-416 and the feature sets 402c-406c by determining a distance (e.g., a cosine distance) between feature vectors.

Although FIG. 4A illustrates the spatial-semantic media search system analyzing three loss functions 422-426 corresponding to three different digital images 402-406 and three different feature sets 402c-406c simultaneously, the spatial-semantic media search system can analyze digital images simultaneously or sequentially. For example, with regard to the embodiment of FIG. 4A, the spatial-semantic media search system trains the query neural network 410 utilizing the loss function 422, feature set 402c, and the predicted feature set 412 in a first training query. Thereafter, the spatial-semantic media search system trains the query neural network 410 utilizing the second loss function 424, the second feature set 404c, and the second predicted feature set 414 in a second training query. More specifically, with regard to the embodiment of FIG. 4A, the spatial-semantic media search system utilizes a Stochastic Gradient Descend algorithm to train the query neural network 410 by minimizing the accumulated stochastic loss defined over each training query.

Training structures and the loss functions can also be described in terms of pseudocode and/or equations implemented by a computing device to minimize accumulated stochastic loss. For instance, the spatial-semantic media search system minimizes a similarity loss function that compares the cosine distance between a predicted feature set, $F_q$ (e.g., the predicted feature set 412), with a known feature set, $F_{I_q}$, (e.g., the feature set 402c), of a training digital image $I_q$ (e.g., the training digital image 402). Specifically, in one or more embodiments, the spatial-semantic media search system utilizes the following similarity loss function:

$$L_s(F_q) = 1 - \cos(F_q, F_{I_q})$$

Minimizing this loss function encourages a query neural network (e.g., the query neural network 410) to predict the feature set $F_q$ as similar as possible to the ground-truth training digital image (e.g., the training digital image 402) on which the training area (e.g., the training area 402a) and the training term (e.g., the training term 402b) are based. In other words, minimizing the loss function (utilizing a Stochastic Gradient Descend algorithm) generates a trained neural network that will generate feature sets that more closely align to targeted visual content within targeted regions of targeted digital images.

The spatial-semantic media search system can utilize a variety of training digital images (with corresponding training terms and training regions) to generate the trained query neural network 430. For example, in one or more embodiments, the spatial-semantic media search system utilizes a training digital image repository comprising thousands of targeted digital images with known visual content and known regions (i.e., digital images with known objects and object meshes). To illustrate, in one or more embodiments, the spatial-semantic media search system utilizes a combination of MS-COCO and Visual Genome datasets. The spatial-semantic media search system can also utilize other digital image repositories, such as digital images managed by the ADOBE STOCK® software and digital image database.

In one or more embodiments, the spatial-semantic media search system also utilizes a spatial mask in training a query neural network. In particular, the spatial-semantic media search system can apply a spatial mask to feature sets of training digital images to focus training of the query neural network on a training area. Specifically, in one or more embodiments, the spatial-semantic media search system determines an object boundary of an object portrayed in a training digital image and applies a spatial mask to a region outside the object boundary to generate a masked feature set. The spatial-semantic media search system can then utilize the masked feature set to train the query neural network.

For example, FIG. 4A illustrates applying a spatial mask to a feature set to generate a masked feature set in accordance with one or more embodiments. In particular, the spatial-semantic media search system applies a spatial mask 432 to the second feature set 404c. Specifically, the spatial-semantic media search system determines an object boundary 428 of an object (i.e., the car) portrayed in the training digital image 404 corresponding to the second feature set 404c. Moreover, the spatial-semantic media search system applies the spatial mask 432 to a region outside of the object boundary 428, such that the second feature set 404c only includes features within the object boundary 428. In this manner, the spatial-semantic media search system removes other visual content portrayed in the training digital image 402 to more quickly focus the query neural network 410 on features included within the second training area 404a (rather than extraneous features outside of the targeted area). Indeed, by applying a spatial mask, the spatial-semantic media search system can significantly improve the speed of training a query neural network.

Although FIG. 4A only illustrates applying a spatial mask to the training digital image 404 corresponding to the second feature set 404c, the spatial-semantic media search system can apply a spatial mask to additional (or all) digital images in training a query neural network. In addition, although FIG. 4A illustrates a particular object boundary 428 (i.e., an object mask that closely follows the contours of a car portrayed in the training digital image 404) and applying the spatial mask 432 to a region outside the object boundary 428, the spatial-semantic media search system can utilize a variety of different object boundaries. For example, in one or more embodiments, the spatial-semantic media search system utilizes an object boundary based on a targeted area (e.g., the object boundary 428 is equivalent to the training area 404a and the spatial-semantic media search system applies a spatial mask to a region outside the training area 404a).

As mentioned previously, in one or more embodiments, the spatial-semantic media search system further trains a query neural network to encourage optimal retrieval performance. In particular, the spatial-semantic media search system can train a query neural network to not only generate query feature sets that are similar to target digital images but that distinguish between irrelevant digital images or queries. Specifically, in one or more embodiments, the spatial-semantic media search system utilizes not only a similarity loss function (as described above), but also utilizes an image-based ranking loss function and/or a query-based ranking loss function in training a query neural network.

For example, FIG. 4B illustrates training a query neural network utilizing a similarity loss function, an image-based ranking loss function, and a query-based ranking loss function in accordance with one or more embodiments of the spatial-semantic media search system. In particular, FIG. 4B illustrates a training area 440a and a training term 440b. Specifically, the training area 440a and the training term 440b correspond to a training digital image 440 having a feature set 440c (i.e., the training digital image 440 portrays the training area term 440b, a person, within the training area 440a, as represented in the training feature set 440c).

As shown, the spatial-semantic media search system provides the training area 440a and the training term 440b to a query neural network 442. Moreover, the training query neural network 442 generates a predicted feature set 444. The spatial-semantic media search system then utilizes a training structure 446 to generate a trained query neural network 460. Specifically, the training structure 446 comprises a query-based ranking loss function 448, a similarity loss function 450, and an image-based ranking loss function 452.

As described above, the similarity loss function 450 comprises a comparison between the predicted feature set 444 and the feature set 440c corresponding to the training digital image. The similarity loss function 450 therefore reflects a measure of similarity between the training digital image 440 utilized to generate the training area 440a and the training term 440b and the predicted feature set 444. Moreover, minimizing the similarity loss function 450 has the effect of teaching the query neural network to generate feature sets similar to feature sets of training digital images.

In addition to the similarity loss function 450, the training structure 446 also includes the query-based ranking loss function 448. The spatial-semantic media search system employs the query-based ranking loss function 448 to encourage proper ranking over a set of queries given a referenced digital image. In other words, the spatial-semantic media search system utilizes the query-based ranking loss function 448 to train the query neural network 442 to generate a query feature set that is not only similar to targeted digital images, but different from irrelevant digital images. As shown, the query-based ranking loss function 448 comprises a comparison between the predicted feature set 444 and a negative digital image feature set 454 based on a negative digital image.

As used herein, the term "negative digital image" refers to a digital image that differs from a training digital image. In particular, the term "negative digital image" includes a digital image that portrays visual content different from a training term describing visual content portrayed in a training digital image. For example, if a training digital image portrays a cat, a negative training digital image would include a digital image that portrays a dog (i.e., not a cat).

As used herein, the term "negative digital image feature set" refers to a feature set generated from a negative digital image. In particular, the term "negative digital image feature set" includes one or more feature vectors that reflect a negative digital image. For example, a negative digital image feature set includes a feature set generated by a digital image neural network based on input of a negative digital image.

In one or more embodiments, the spatial-semantic media search system generates, determines, and/or identifies a negative digital image and/or a negative digital image feature set. For instance, in relation to the embodiment of FIG. 4B, the spatial-semantic media search system searches a repository of training digital images to identify the negative digital image feature set 454. Specifically, the spatial-semantic media search system conducts a search of a repository of training digital images based on the training term 440b to identify training digital images that do not portray visual content corresponding to the training term 440b. For example, because the training term 440b is "person," the spatial-semantic media search system conducts a search for a training digital image portraying visual content that does not include a person. Upon identifying a negative training digital image, the spatial-semantic media search system also identifies or generate a corresponding negative training digital image feature set (e.g., from the repository of training digital images or by utilizing a digital image neural network).

In one or more embodiments, the spatial-semantic media search system can also select a negative digital image based on a query area. For instance, in relation to FIG. 4B the spatial-semantic media search system conducts a search for training digital images (i.e., from a repository of training digital images) that portray visual content within the training area 440a where the visual content does not include a person. The spatial-semantic media search system can, thus, identify a negative digital image that includes visual content in a spatial location that corresponds to the training area 440a. In this manner, the spatial-semantic media search system can introduce some concept overlap (i.e., spatial similarity) between the negative digital image feature set and the feature set 440c of the training digital image 440. Moreover, the spatial-semantic media search system can train the query neural network 442 to distinguish between digital images that contain different visual content in the same (or similar) spatial location.

The spatial-semantic media search system can also utilize a query neural network to select negative digital images. For instance, in one or more embodiments, the spatial-semantic media search system determines training digital images that a query neural network (e.g., the query neural network 442) has difficulty distinguishing and then utilizes those training digital images to further train the query neural network. Specifically, as already discussed in relation to FIG. 2, the spatial-semantic media search system can utilize a query neural network to generate a query feature set. Moreover, the spatial-semantic media search system can utilize the query feature set to select digital images from a repository of training digital images. The spatial-semantic media search system can then analyze the training digital images selected by the query neural network (e.g., the top one-hundred selected digital images), to determine irrelevant digital images that the query neural network has selected (e.g., training digital images with low-similarity that the query neural network nonetheless identified as similar). The spatial-semantic media search system can then utilize the training digital images that were improperly selected by the query neural network as negative training digital images.

For example, utilizing the approach describe in FIG. 2, the query neural network 442 identifies an irrelevant training digital image as the fifth most relevant digital image. The spatial-semantic media search system then utilizes the irrelevant training digital image to further train the query neural network 442. In this manner, the spatial-semantic media search system identifies training digital images that the query neural network 442 has difficulty accurately distinguishing, and then utilizes those training digital images to teach the query neural network 442 to more accurately and efficiently generate query features sets.

Upon identifying the negative digital image feature set, in one or more embodiments, the spatial-semantic media search system compares the negative digital image feature set and a predicted feature set. For example, the spatial-semantic media search system utilizes a loss function that measures a distance (e.g., cosine distance) between the predicted feature set and the negative digital image feature set. Indeed, as shown in FIG. 4B, the spatial-semantic media search system utilizes the query-based ranking loss function 448, which compares the negative digital image feature set 454 and the predicted feature set 444.

In addition to comparing a negative digital image feature set and a predicted feature set, the spatial-semantic media search system can also compare the difference between a negative digital image feature set and a predicted feature set with the difference between a feature set of a training digital image and a predicted feature set. In this manner, the spatial-semantic media search system encourages the query neural network to distinguish between digital images and negative digital images.

For example, in relation to FIG. 4B, the spatial-semantic media search system compares a difference between the negative digital image feature set 454 and the predicted feature set 444 with a difference between the feature set 440c of the training digital image 440 and the predicted feature set 444. In other words, the query-based ranking loss function 448 measures the ability of the query neural network 442 to differentiate between the negative digital image feature set and the feature set of the training digital image. By minimizing the query-based ranking loss function 448, the spatial-semantic media search system encourages the query neural network 442 to generate query feature sets that are not only similar to targeted digital images but dis-similar from irrelevant digital images.

A query-based ranking loss function can also be described in terms of pseudocode and/or equations implemented by a computing device to minimize query-based ranking loss. For instance, in one or more embodiments, the spatial-semantic media search system utilizes the following query-based ranking loss function:

$$L_{r_q}(F_q) = \max(0, a - \text{Cos}(F_q, F_{I_q}) + \text{Cos}(F_q, F_{\overline{I_q}}))$$

where $F_{\overline{I_q}}$ denotes the negative digital image feature set (e.g., the negative digital image feature set 454) extracted from a negative training digital image, $I_{\overline{q}}$. Minimizing this loss encourages the proper ranking over a set of queries given a referenced digital image.

As shown in FIG. 4B, in addition to the query-based ranking loss function 448, the spatial-semantic media search system also utilizes an image-based ranking loss function 452. The spatial-semantic media search system utilizes the image-based ranking loss function 452 to encourage proper ranking of images given a query feature set. In other words, the image-based loss function encourages generation of query features sets that not only accurately reflect digital images that portray particular terms, but that distinguish between images that portray irrelevant query terms. As shown, the image-based ranking loss function 452 comprises a comparison between the predicted feature set 444 and a negative training term feature set 458 generated from a negative training term 462.

As used herein, the term "negative training term" refers to a word or phrase that differs from a training term. In particular, the term "negative training term" includes a word or phrase with a different linguistic meaning than a training term. For example, if the spatial-semantic media search system utilizes a training term "hot," a negative training term would include "cold" (or a term or phrase different than hot).

As used herein, the term "negative training term feature set" refers to a feature set generated from a negative training term. In particular, the term "negative training term feature set" includes one or more feature vectors that reflect a negative training term. For example, a negative training term feature set includes a feature set generated by a query neural network with a negative training term as input.

In one or more embodiments, the spatial-semantic media search system generates, determines, and/or identifies a negative training term. To illustrate, in relation to the embodiment of FIG. 4B, the spatial-semantic media search system selects the negative training term 462 (i.e., "candy") based on the training term 440b (i.e., "person"). Specifically, the spatial-semantic media search system randomly selects a term that differs from the training term 440b.

In addition, in one or more embodiments, the spatial-semantic media search utilizes a query neural network (e.g., the query neural network 442) to select a negative training term. For example, in one or more embodiments, the spatial-semantic media search system determines negative training terms that a query neural network has difficulty distinguishing and then utilizes those negative training terms to further train the query neural network.

Specifically, as discussed in relation to FIG. 2, the spatial-semantic media search system can utilize a query neural network to generate a query feature set. Moreover, the spatial-semantic media search system can utilize the query feature set to select digital images from a repository of training digital images. The spatial-semantic media search system can then analyze the training digital images selected by the query neural network to determine irrelevant visual concepts portrayed in the selected training digital images. The spatial-semantic media search system can then utilize the irrelevant visual concepts selected by the query neural network as negative training terms.

For example, utilizing the approach described in relation to FIG. 2, the query neural network 442 can search for digital images portraying a person from a repository of training digital images. Moreover, the query neural network 442 can identify a picture of candy as the top resulting digital image. The spatial-semantic media search system can determine that the object candy portrayed in the resulting digital image is irrelevant. In response, the spatial-semantic media search system can utilize the irrelevant training term "candy" as a negative training term in training the query neural network 442.

Upon identifying a negative training term, the spatial-semantic media search system can also generate a negative training term feature set. For example, as shown in FIG. 4B, the spatial-semantic media search system can utilize the query neural network 442 to generate the negative training term feature set 458. In particular, in relation to the embodiment of FIG. 4B, the spatial-semantic media search system provides the negative training term 462 to the query neural network 442. Specifically, the spatial-semantic media search system provides the negative training term 462 to the query neural network 442 together with the training area 440a (e.g., as a three-dimensional grid comprising a vector representing the negative training term 462 mapped to the training area 440a).

As shown in FIG. 4B, the spatial-semantic media search system can then utilize the query neural network 442 to generate the negative training term feature set 458. Moreover, the spatial-semantic media search system can then utilize the negative training term feature set 458 in the image-based ranking loss function 452. Specifically, the spatial-semantic media search system can compare the negative training term feature set 458 with the predicted feature set 444. For example, the spatial-semantic media search system determines a distance between the negative training term feature set 458 and the predicted feature set 444.

Moreover, in one or more embodiments, the spatial-semantic media search system utilizes a loss function that compares the difference between the negative training term feature set and the predicted feature set with a difference between the feature set of the training digital image and the predicted feature set. For instance, in relation to FIG. 4B, the spatial-semantic media search system utilizes the image-based ranking loss function 452, which compares a difference between the negative training term feature set 458 and the predicted feature set 444 with a difference between the feature set 440c and the predicted feature set 444. Utilizing this approach, the spatial-semantic media search system measures the ability of the query neural network 442 to differentiate between the negative training term feature set and the feature set of the training digital image. Specifically, by minimizing the image-based loss function 552, the spatial-semantic media search system encourages the query neural network to generate query feature sets that are not only similar to query terms but dis-similar from irrelevant query terms.

An image-based ranking loss function can also be described in terms of pseudocode and/or equations implemented by a computing device to minimize image-based ranking loss. For instance, in one or more embodiments, the spatial-semantic media search system utilizes the following image-based ranking loss function:

$$L_{r_I}(F_q) = \max(0, \alpha - \cos(F_q, F_{I_q}) + \cos(F_a, F_{I_q}))$$

where $F_q$ denotes a negative training term feature set (e.g., the negative training term feature set 458) generated based on a negative training term (e.g., generated based on the negative training term 462 and the training area 440a). Minimizing this loss encourages the proper ranking of images given a predicted query feature set.

As mentioned above, in one or more embodiments, the spatial-semantic media search system jointly minimizes loss functions. In particular, the spatial-semantic media search system can jointly minimize a similarity loss function, an image-based ranking loss function, and a query-based ranking loss function. For instance, FIG. 4B illustrates the training structure 446 jointly minimizing the query-based ranking loss function 448, the similarity loss-function 450, and the image-based ranking loss function 452. Indeed, in relation to FIG. 4B, the spatial-semantic media search system minimizes the following joint loss function:

$$L(F_q) = L_s(F_q) + L_{r_I}(F_a) + L_{r_q}(F_q)$$

Specifically, the spatial-semantic media search system utilizes a Stochastic Gradient Descent algorithm to train the query neural network 442 to minimize the accumulated stochastic loss of the three loss functions, $L_s(F_q)$, $L_{r_I}(F_q)$, $L_q(F_q)$, over each training query.

Furthermore, as discussed above, by minimizing the joint loss function, the spatial-semantic media search system encourages the trained model to optimize retrieval performance. Indeed, as mentioned the spatial-semantic media search system trains the query neural network 442 to generate query feature sets that accurately reflect similar digital images while differentiating between irrelevant digital images and irrelevant query terms. By jointly minimizing the three individual losses, the query neural network 442 will be trained (i.e., the spatial-semantic media search system will generate the trained query neural network 460) so as to optimize the similarity of its predicted features and at the same time encourage the proper ranking among both the queries and the images in terms of their relevance.

Although FIG. 4B illustrates a single negative training term 462 and a single negative training term feature set 458, the spatial-semantic media search system can identify and generate multiple negative training terms and negative training term feature sets. Moreover, the spatial-semantic media search system can determine an image-based ranking loss function that analyzes the difference between multiple negative training term digital images and the predicted feature set 444.

Similarly, although FIG. 4B illustrates a single negative digital image feature set 454, the spatial-semantic media search system can select multiple negative digital images and negative digital image feature sets. Moreover, the spatial-semantic media search system can calculate a query-based ranking loss function that analyzes the difference between multiple negative digital image feature sets and the predicted feature set 444.

Furthermore, although FIGS. 4A-4B illustrate training areas 402a-406a as rectangles, the spatial-semantic media search system can define training areas in a variety of different forms. For instance, rather than utilizing rectangles that define training areas around visual content portrayed in a training digital image, the spatial-semantic media search system can define training areas that comprise circles or polygons. Similarly, the spatial-semantic media search system can utilize object masks that closely follow the contours of visual content portrayed in a training digital image to generate a training area.

As mentioned above, in addition to identifying a digital image based on a query term and query area, in one or more embodiments, the spatial-semantic media search system iteratively searches for digital images based on iterative user input of query terms and query areas. For example, FIGS. 5A-5C illustrate a user interface for iterative user input of query terms and query areas and for iteratively displaying targeted digital images based on the query terms and query areas in accordance with one or more embodiments.

Figure 5A:
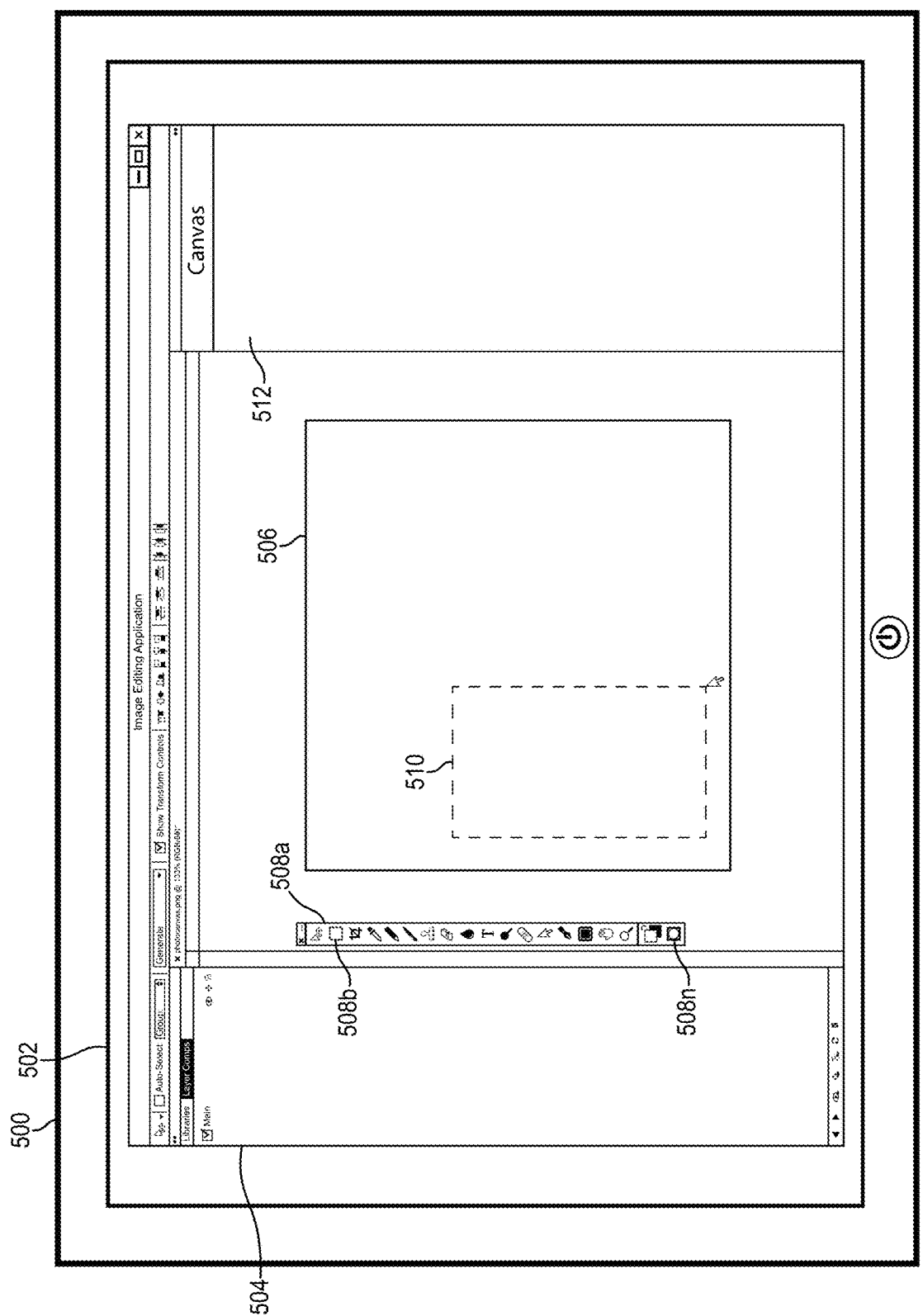
FIGS. 5A-5C illustrate a computing device and graphical user interface for conducting a search for digital images utilizing a digital canvas in accordance with one or more embodiments.
Figure 5B:
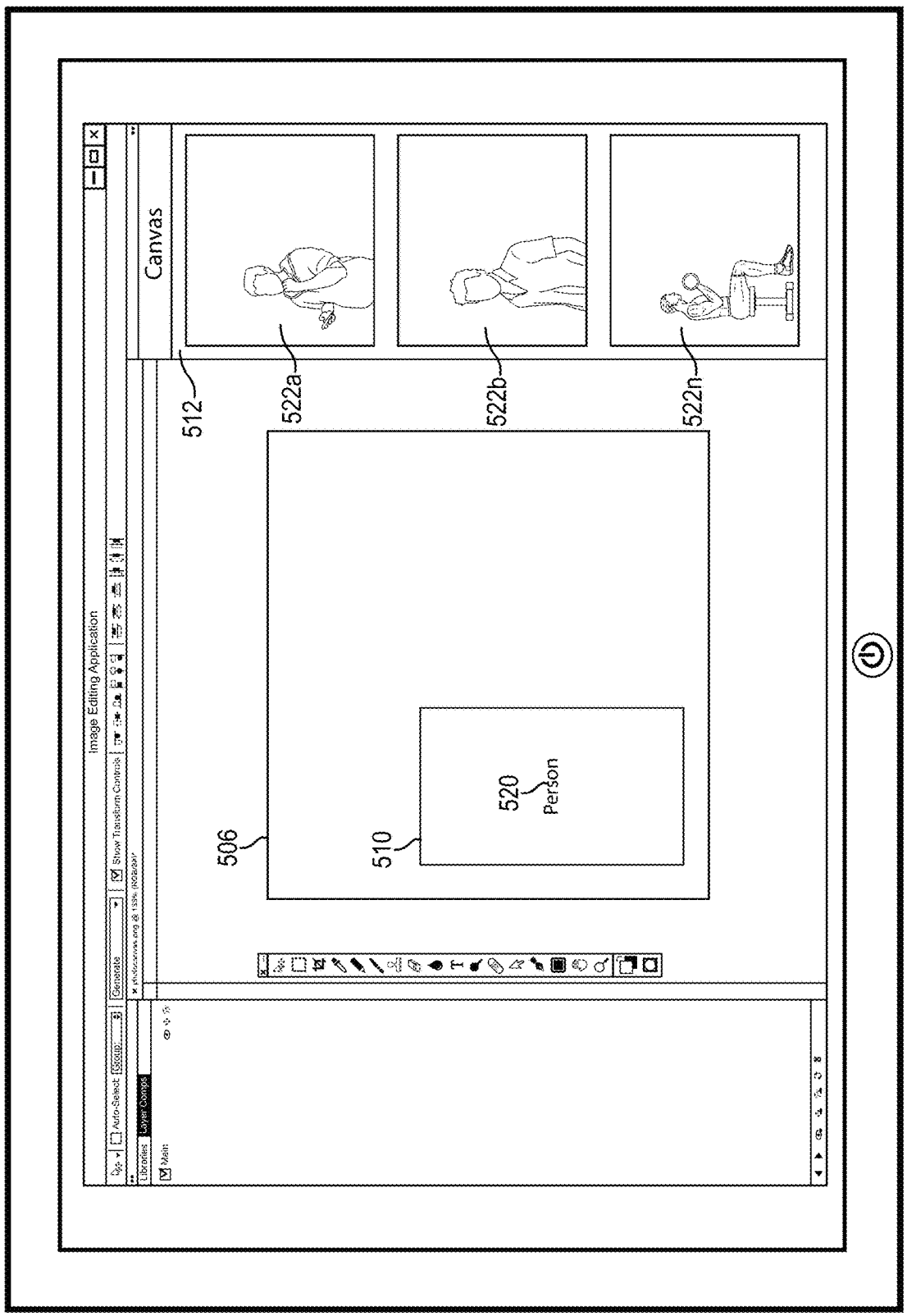
Figure 5C:
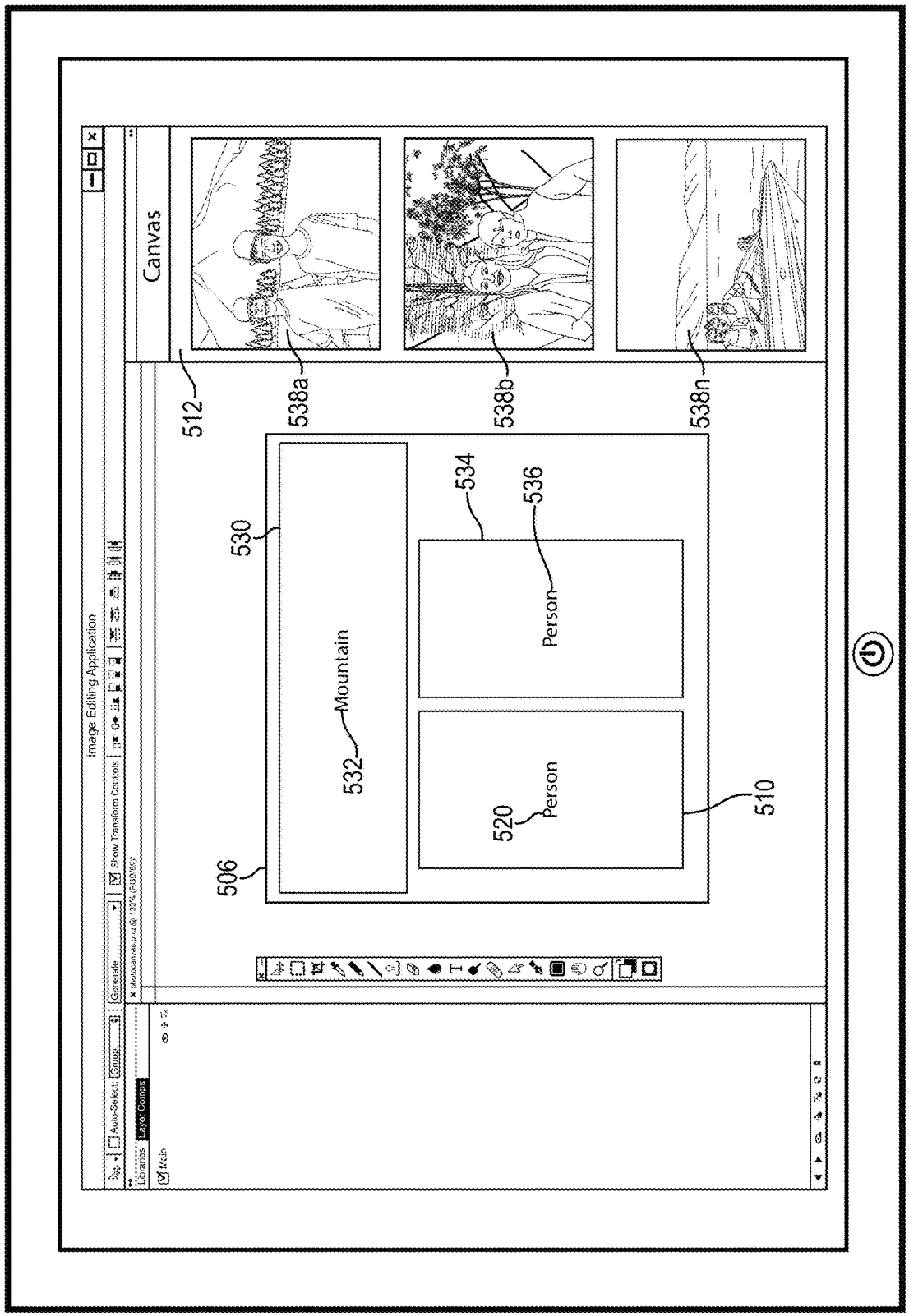

In particular, FIG. 5A illustrates a computing device 500 with a screen 502 displaying a user interface 504. As shown, the user interface 504 includes a digital canvas 506. Moreover, the user interface 504 comprises a plurality of user interface elements 508a-508n for creating, editing, and modifying the digital canvas 506. Further, the user interface 504 includes a search results area 512 for displaying digital images resulting from a search based on the digital canvas 506. As shown, a user can interact with the digital canvas 506 via the user interface 504 to provide a query area 510. For example, FIG. 5A illustrates user input of the query area 510 via a select event (e.g., of a mouse or touchscreen), drag event, and release event.

In addition to user input of the query area 510, a user can also provide user input of a query term. For example, based on user interaction (e.g., selection) of the query area 510, a user can provide user input of a query term. For instance, FIG. 5B illustrates the user interface 504 upon user input of a query term. As shown, the digital canvas 506 includes a query area 510 and a query term 520. Moreover, based on the query area 510 and the query term 520, the spatial-semantic media search system identifies a first plurality of resulting digital images 522a-522n and displays the plurality of resulting digital images 522a-522n in the search results area 512.

Specifically, as discussed above, the spatial-semantic media search system provides the query area 510 and the query term 520 to a query neural network. In response, the query neural network generates a query feature set and compares the query feature set to a repository of digital images. More particularly, the spatial-semantic media search system compares the query feature set digital image feature sets corresponding to the repository of digital images. Based on the comparison, the spatial-semantic media search system identifies the first plurality of resulting digital images 522a-522n. The spatial-semantic media search system identifies the first plurality of resulting digital images 522a-522n comprising targeted visual content corresponding to the query term 520 within a targeted region corresponding to the query area 510.

The spatial-semantic media search system can also receive additional user input of additional query terms and query areas and identify additional resulting digital images. For example, FIG. 5C illustrates the user interface 504 upon user input of a second query area 530, a second query term 532, a third query area 534, and a third query term 536. Based on the query area 510, the query term 520, the second query area 530, the second query term 532, the third query area 534, and the third query term 536, the spatial-semantic media search system identifies a second plurality of resulting digital images 538a-538n. Thus, as illustrated, users can gradually explore different search results by iteratively adding concepts on the canvas instead of specifying all the elements at once.

The spatial-semantic media search system can identify the second plurality of digital images 538a-538n in a variety of ways. In one or more embodiments, the spatial-semantic media search system provides the query area 510, the query term 520, the second query area 530, the second query term 532, the third query area 534, and the third query term 536 to the query neural network to generate a second query feature set. To illustrate, the spatial-semantic media search system can generate a three-dimensional grid that encodes the query term 520 to a spatial location corresponding to the query area 510, the second query term 532 to a spatial location corresponding to the second query area 530, and the third query term 536 to a spatial location corresponding to the third query area 534. The spatial-semantic media search system can provide the three-dimensional grid to a query neural network to generate a second query feature set. Moreover, the spatial-semantic media search system can utilize the second query feature set to identify the second plurality of resulting digital images 538a-538n.

Rather than generate a second query feature set by providing the query area 510, the query term 520, the second query area 530, the second query term 532, the third query area 534, and the third query term 536 to the query neural network, in one or more embodiments, the spatial-semantic media search system utilizes the original query feature set (i.e., generated in relation to FIG. 5B). In particular, the spatial-semantic media search system can provide the original query feature set together with a representation (e.g., a three-dimensional grid) of the second query area 530, the second query term 532, the third query area 534, and the third query term 536 to the query neural network. The query neural network can then generate the second query feature set based on the original query feature set together with the representation of the second query area 530, the second query term 532, the third query area 534, and the third query term 536.

Although FIGS. 5A-5C illustrate the user interface 504 providing resulting digital images in the search results area 512, the spatial-semantic media search system can provide one or more resulting digital images in other locations or via other elements. For example, in one or more embodiments, the spatial-semantic media search system provides a resulting digital image on the digital canvas 506. Thus, after receiving the first query area and the first query term, the spatial-semantic media search system can provide a resulting digital image via the digital canvas 506. Moreover, the spatial-semantic media search system can provide a second resulting digital image via the digital canvas 506 upon receiving additional query terms and/or query areas. In this manner, the spatial-semantic media search system can allow a user to see how the query areas and query terms correspond to resulting digital images via the digital canvas 506.

In addition, although FIGS. 5A-5C illustrate conducting a search for targeted digital images based on query terms and query areas, it will be appreciated that the spatial-semantic media search system can also conduct searches utilizing other inputs. For example, in one or more embodiments, the spatial-semantic media search system can conduct a search for digital images based on a background tag (e.g., a query term for the background of a target digital image). To illustrate, the spatial-semantic media search system can receive user input of a term as a background tag and conduct a search for images that display the background tag. Specifically, the spatial-semantic media search system can provide the background tag to a neural network (e.g., in a three-dimensional grid where the entire spatial area of the three-dimensional grid is encoded with a vector corresponding to the background tag), and the spatial-semantic media search system can utilize the neural network to generate a query feature set. The spatial-semantic media search system can then utilize the query feature set to identify targeted digital images that display targeted visual content corresponding to the background tag.

Although the foregoing example describes conducting a search utilizing a background tag by itself, the spatial-semantic media search system can also conduct a search based on a background tag and one or more additional query terms and query areas. For example, the spatial-semantic media search system can receive user input of a background tag and a query area and a query term. The spatial-semantic media search system can provide the background tag, the query area, and the query term to a neural network (e.g., in the form of a three-dimensional grid with a first spatial area corresponding to the query area defined by a vector corresponding to the query term, and the remainder of the three-dimensional grid defined by a vector corresponding to the background term). The spatial-semantic media search system can utilize the neural network to generate a query feature set and identify digital images portraying visual content corresponding to the first query term within a targeted region corresponding to the query while also displaying visual content corresponding to the background tag in the background of the digital image.

In addition to background tags, the spatial-semantic media search system can also conduct a search based on an existing digital image. For example, a user may have an existing digital image that has a variety of desirable characteristics (e.g., a picture of the beach), but the existing digital image is missing one desired element (e.g., the picture is missing a beach ball on the left side of the image). The spatial-semantic media search system can conduct a search based on the existing digital image and a query area and query term.

To illustrate, a user can provide user input of the existing digital image (e.g., select the existing digital image) and a query term (e.g., "beach ball), and a query area (e.g., a targeted region on the left side). The spatial-semantic media search system can generate a feature set based on the existing digital image (e.g., utilizing a digital image neural network) and a query feature set based on the query term and the query area. The spatial-semantic media search system can then conduct a search based on both the feature set based on the existing digital image and the query feature set based on the query term and the query area. For instance, the spatial-semantic media search system can analyze digital image feature sets and determine a distance between the digital image feature sets and the feature set based on the existing digital image and the query feature set based on the query term and the query area. In this manner, the spatial-semantic media search system can identify targeted digital images that are similar to the existing digital image and that portray visual content corresponding to the query term within a targeted region corresponding to the query area.

Similarly, the spatial-semantic media search system can also conduct searches based on one or more modifiers. For example, the spatial-semantic media search system can support color modifiers. For instance, in one or more embodiments, the spatial-semantic media search system can train the neural network to convert color terms into a color feature set and combine the color feature set with other query feature sets. The spatial-semantic media search system can then identify targeted digital images based on the color feature set and the other query feature sets. Similarly, in one or more embodiments, the spatial-semantic media search system can combine a color modifier with other query terms in generating a query feature set (e.g., convert the color modifier together with other query terms utilizing a word to vector algorithm and providing the query terms to the query neural network). In this manner, the spatial-semantic media search system can identify targeted digital images that match query terms and query areas, while also displaying particular colors.

Figure 6:
FIG. 6 illustrates a representation of a plurality of exemplary spatial-semantic searches and search results in accordance with one or more embodiments.

As mentioned above, the spatial-semantic media search system allows users to quickly and easily identify a plurality of targeted digital images that portray targeted visual content within a targeted region. To illustrate, FIG. 6 illustrates three example queries with the top ten resulting digital images. In particular, FIG. 6 illustrates a first digital canvas 602, a second digital canvas 604, and a third digital canvas 606. Furthermore, FIG. 6 illustrates a first plurality of search results 602a corresponding to the first digital canvas 602, a second plurality of search results 604a corresponding to the second digital canvas 604, and a third plurality of search results 606a corresponding to the third digital canvas 606. As illustrated, in each instance, the spatial-semantic media search system is able to identify digital visual media that portrays targeted visual content corresponding to query terms within targeted regions corresponding to targeted query areas.

Figure 7:
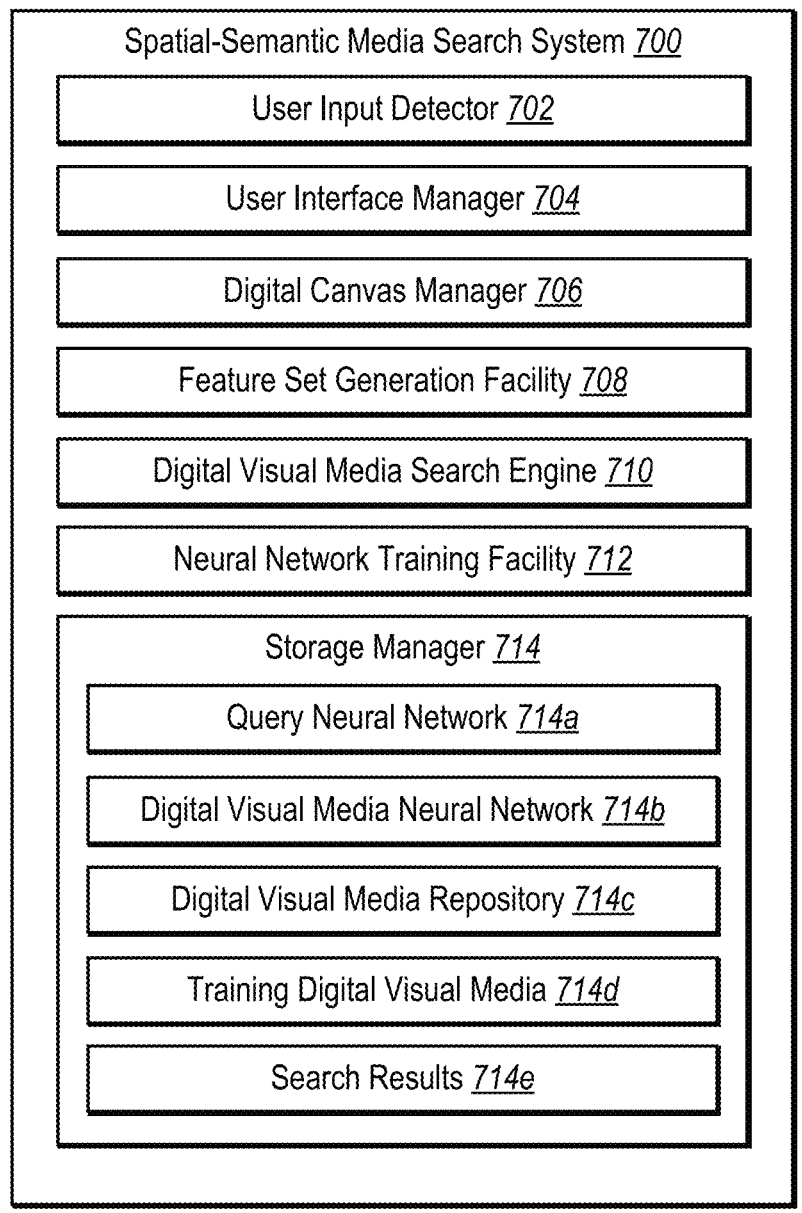
FIG. 7 illustrates a schematic diagram illustrating a spatial-semantic media search system in accordance with one or more embodiments.

Turning now to FIG. 7, additional detail is provided regarding components and capabilities of one embodiment of the spatial-semantic media search system. In particular, FIG. 7 illustrates an embodiment of an exemplary spatial-semantic media search system 700 (e.g., the spatial-semantic media search system referenced above). As shown, the spatial-semantic media search system 700 may include, but is not limited to, a user input detector 702, a user interface manager 704, a digital canvas manager 706, a feature set generation facility 708, a digital visual media search engine 710, a neural network training facility 712, and a storage manager 714 (comprising a query neural network 714a, a digital visual medial neural network 714b, a digital visual media repository 714c, training digital visual media 714d, and search results 714e).

As just mentioned, and as illustrated in FIG. 7, the spatial-semantic media search system 700 may include the user input detector 702. The user input detector 702 can detect, identify, monitor, receive, process, capture, and/or record various types of user input. For example, the user input detector 702 can detect one or more user interactions with respect to a user interface and/or a digital canvas. In particular, the user input detector 702 can detect user input of a query term and/or query area via a digital canvas.

The user input detector 702 can operate in conjunction with any number of user input devices or computing devices (in isolation or in combination), including personal computers, laptops, smartphones, smart watches, tablets, touch-screen devices, televisions, personal digital assistants, mouse devices, keyboards, track pads, or stylus devices. The user input detector 702 detects and identifies various types of user interactions with user input devices, such as press events, drag events, scroll events, release events, and so forth. For example, in the event a client device corresponding to the spatial-semantic media search system 700 includes a touch screen, the user input detector 702 detects one or more touch gestures (e.g., swipe gestures, tap gestures, pinch gestures, or reverse pinch gestures) from a user that forms a user interaction.

As just mentioned, and as illustrated in FIG. 7, the spatial-semantic media search system 700 also includes the user interface manager 704. The user interface manager 704 provides, manages, and/or controls a graphical user interface (or simply "user interface") for use with the spatial-semantic media search system 700. In particular, the user interface manager 704 can facilitate presentation of information by way of an external component of a client device (e.g., the computing device 500). For example, the user interface manager 704 can display a user interface by way of a display screen associated with a client device. The user interface may be composed of a plurality of graphical components, objects, and/or elements that allow a user to perform a function. The user interface manager 704 presents, via a client device, a variety of types of information, including text, images, video, audio, characters, or other information. Moreover, the user interface manager 704 provides a variety of user interfaces (e.g., the user interface 504) specific to any variety of functions, programs, applications, plug-ins, devices, operating systems, and/or components of a client device. In addition, the user interface manager 704 can provide a variety of elements for display, including a digital canvas, query terms, query areas, and/or other fields or selectable elements.

In addition, as shown in FIG. 7, the spatial-semantic media search system 700 also includes the digital canvas manager 706. The digital canvas manager 706 can identify, receive, determine, detect, extract, and/or manage user input via a digital canvas. In particular, the digital canvas manager 706 can receive one or more query terms and one or more query areas corresponding to a digital canvas. Similarly, the digital canvas manager 706 can determine a background tag and existing digital images (e.g., background tags or existing digital images that a user seeks to utilize in searching for a targeted digital image).

Moreover, as illustrated in FIG. 7, the spatial-semantic media search system 700 also includes the feature set generation facility 708. The feature set generation facility 708 can create, generate, populate, determine, and/or identify one or more feature sets. For instance, as described above, the feature set generation facility 708 can utilize a digital canvas to generate a query feature set. Similarly, the feature set generation facility 708 can utilize a digital image to generate a digital image feature set.

To illustrate, the feature set generation facility 708 can generate a representation of a query term and a query area. For example, as described above, the feature set generation facility 708 can generate a three-dimensional grid reflecting a query term and a query area from a digital canvas. Moreover, the feature set generation set can provide the representation of the query term and query area to a query neural network (e.g., the query neural network 714*a*) to generate a query feature set.

Similarly, the feature set generation facility 708 can generate a digital image feature set. For instance, the feature set generation facility 708 can provide a digital image to a digital image neural network (e.g., the digital visual media neural network 714*b*) to generate a digital image feature set.

As shown in FIG. 7, the spatial-semantic media search system 700 can also include the digital visual media search engine 710. The digital visual media search engine 710 can identify, select, and/or determine visual media corresponding to a digital canvas. In particular, the digital visual media search engine 710 can identify digital images that portray targeted visual media corresponding to a query term within a targeted region corresponding to a query area. As described, in one or more embodiments, the digital visual media search engine 710 identifies digital images by comparing one or more query feature sets and one or more digital image feature sets (e.g., from the feature set generation facility 708).

In addition, as shown in FIG. 7, the spatial-semantic media search system 700 can also include the neural network training facility 712. The neural network training facility 712 can guide, teach, encourage, and train a neural network to produce desired output. In particular, as described above, the neural network training facility 712 can train a query neural network to generate a query feature set (e.g., by utilizing training terms, training areas, a similarity loss function, a query-based loss function, and/or an image-based loss function). Furthermore, the neural network training facility 712 can also train a digital image neural network (e.g., utilizing training digital images and a similarity loss function).

Moreover, as illustrated in FIG. 7, the spatial-semantic media search system 700 also includes the storage manager 714. The storage manager 714 maintains data to perform the functions of the spatial-semantic media search system 700. The storage manager 714 can comprise one or more memories or storage devices to maintain data for the spatial-semantic media search system 700. As illustrated, the storage manager 714 includes the query neural network 714*a* (e.g., the trained query neural network 430 or the trained query neural network 460), the digital image neural network 714*b* (e.g., the digital image neural network 210), the digital image visual media repository 714*c* (e.g., a plurality of digital images that a user seeks to search), training digital visual media 714*d* (e.g., a plurality of training digital images portraying known visual content, training digital image feature sets, training terms, training areas, and/or object boundaries), and search results 714*e* (e.g., identified digital images and/or query feature sets).

Each of the components 702-714 of the spatial-semantic media search system 700 (as shown in FIG. 7) may be in communication with one another using any suitable communication technologies. It will be recognized that although components 702-714 of the spatial-semantic media search system 700 are shown to be separate in FIG. 7, any of components 702-714 may be combined into fewer components, such as into a single facility or module, divided into more components, or configured into different components as may serve a particular embodiment.

The components 702-714 of the spatial-semantic media search system 700 can comprise software, hardware, or both. For example, the components 702-714 can comprise one or more instructions stored on a computer-readable storage medium and executable by processors of one or more computing devices. When executed by the one or more processors, the computer-executable instructions of the spatial-semantic media search system 700 can cause a client device and/or a server device to perform the methods described herein. Alternatively, the components 702-714 and their corresponding elements can comprise hardware, such as a special purpose processing device to perform a certain function or group of functions. Additionally, the components 702-714 can comprise a combination of computer-executable instructions and hardware.

Furthermore, the components 702-714 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 702-714 may be implemented as a stand-alone application, such as a desktop or mobile application. Furthermore, the components 702-714 may be implemented as one or more web-based applications hosted on a remote server. The components 702-714 may also be implemented in a suit of mobile device applications or "apps." To illustrate, the components 702-714 may be implemented in an application, including but not limited to ADOBE PHOTOSHOP software, ADOBE STOCK software and image repository, or ADOBE LIGHTROOM software. "ADOBE," "PHOTOSHOP," "STOCK," and "LIGHTROOM" are either registered trademarks or trademarks of Adobe Systems Incorporated in the United States and/or other countries.

Figure 8:
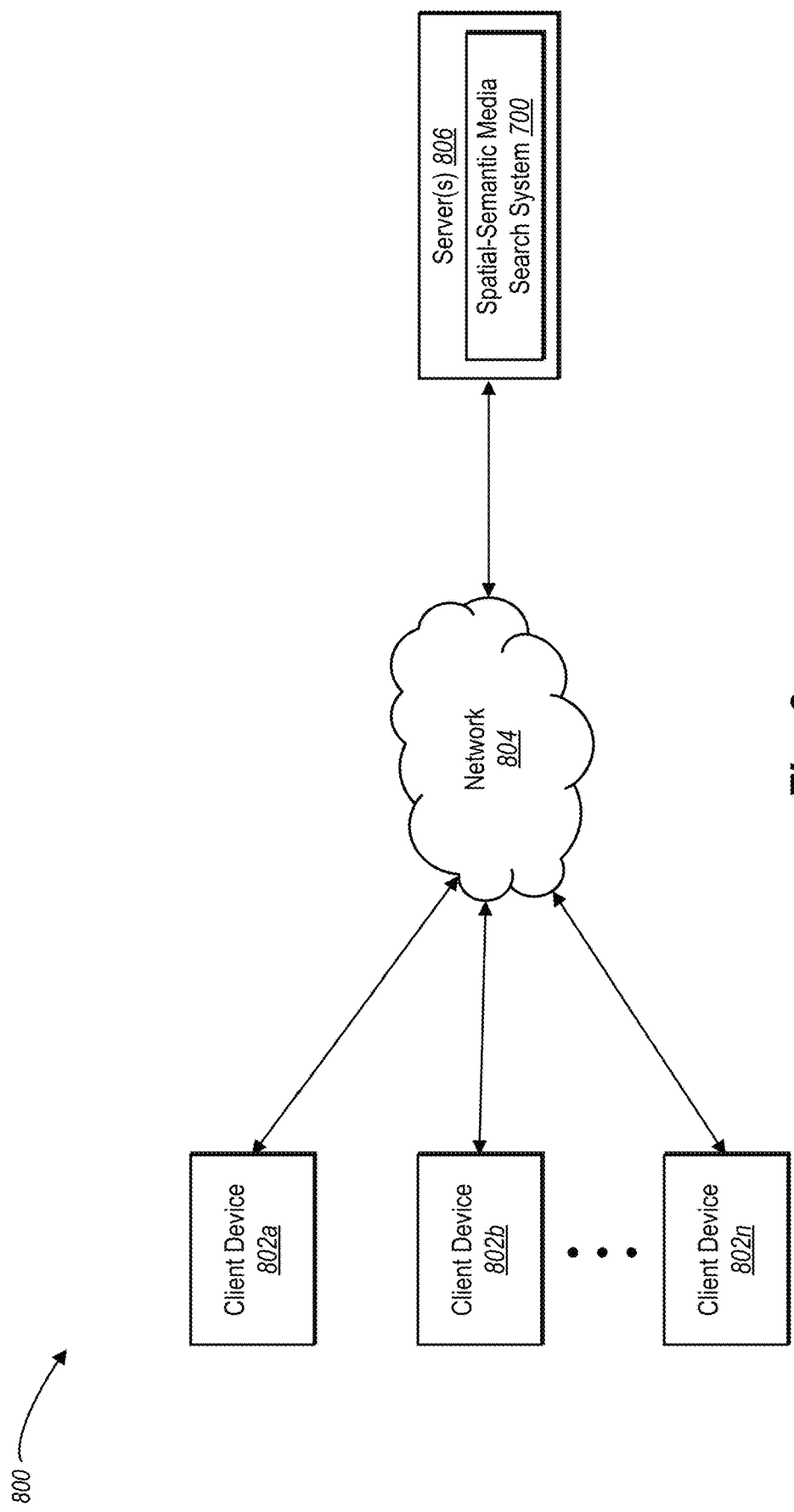
FIG. 8 illustrates a schematic diagram illustrating an exemplary environment in which the spatial-semantic media search system may be implemented in accordance with one or more embodiments.

FIG. 8 illustrates a schematic diagram of one embodiment of an exemplary environment 800 in which the spatial-semantic media search system 700 can operate. In one or more embodiments, the exemplary environment 800 includes one or more client devices 802*a*, 802*b*, . . . 802*n*, a network 804, and server(s) 806. The network 804 may be any suitable network over which the computing devices can communicate. Example networks are discussed in more detail below with regard to FIG. 10.

As illustrated in FIG. 8, the environment 800 may include client devices 802*a*-802*n*. The client devices 802*a*-802*n* may comprise any computing device. For instance, in one or more embodiments, one or more of the client devices 802*a*-802*n* comprise one or more computing devices described below in relation to FIG. 10.

In addition, the environment 800 may also include the server(s) 806. The server(s) 806 may generate, store, receive, and transmit any type of data, including the query neural network 714*a*, the digital visual media neural network 714*b*, the digital visual media repository 714*c*, the training digital visual media 714*d*, and the search results 714*e*. For example, the server(s) 806 may transmit data to a client device, such as the client device 802*a*. The server(s) 806 can also transmit electronic messages between one or more users of the environment 800. In one example embodiment, the server(s) 806 comprise a content server. The server(s) 806 can also comprise a communication server or a web-hosting server. Additional details regarding the server(s) 806 will be discussed below with respect to FIG. 10.

As illustrated, in one or more embodiments, the server(s) 806 can include all, or a portion of, the spatial-semantic media search system 700. In particular, the spatial-semantic media search system 700 can comprise an application running on the server(s) 806 or a portion of a software application that can be downloaded from the server(s) 806. For example, the spatial-semantic media search system 700 can include a web hosting application that allows the client devices 802a-802n to interact with content hosted at the server(s) 806. To illustrate, in one or more embodiments of the exemplary environment 800, one or more client devices 802a-802n can access a webpage supported by the server(s) 806. In particular, the client device 802a can run an application to allow a user to access, view, and/or interact with a webpage or website hosted at the server(s) 806.

Although FIG. 8 illustrates a particular arrangement of the client devices 802a-802n, the network 804, and the server(s) 806, various additional arrangements are possible. For example, while FIG. 8 illustrates multiple separate client devices 802a-802n communicating with the server(s) 806 via the network 804, in one or more embodiments a single client device may communicate directly with the server(s) 806, bypassing the network 804.

Similarly, although the environment 800 of FIG. 8 is depicted as having various components, the environment 800 may have additional or alternative components. For example, the spatial-semantic media search system 700 can be implemented on a single computing device. In particular, the spatial-semantic media search system 700 may be implemented in whole by the client device 802a or the spatial-semantic media search system 700 may be implemented in whole by the server(s) 806. Alternatively, the spatial-semantic media search system 700 may be implemented across multiple devices or components (e.g., utilizing the client devices 802a-802n and the server(s) 806).

By way of example, in one or more embodiments, the client device 802a receives user input (e.g., via the user input detector 702) of a query term and a query area via a digital canvas (e.g., via the digital canvas manager 706). Moreover, the client device 802a sends the query term and the query area to the server(s) 806. The server(s) 806 provide the query term and the query area (e.g. via the feature set generation facility 708) to a query neural network (e.g., the query neural network 714a) to generate a query feature set. Furthermore, the server(s) 806 compare (e.g., via the digital visual media search engine 710) the query feature set with a plurality of digital image feature sets learned (e.g., via the feature set generation facility 708) from a plurality of digital images using a digital image neural network (e.g., the digital image neural network 714b). Based on the comparison, the server(s) 806 identify (e.g., via the digital visual media search engine 710) a digital image portraying targeted visual content corresponding to the query term within a targeted visual area corresponding to the query area. Moreover, the server(s) 806 provide the identified digital image for display to the client device 802a (e.g., via the user interface manager 704).

Furthermore, in one or more embodiments, the server(s) 806 also train a query neural network and/or a digital image neural network (e.g., via the neural network training facility 712). Indeed, as discussed previously, in one or more embodiments, the server(s) 806 provide a query neural network with a training area and training term corresponding to a training digital image and train the query neural network by comparing a predicted feature set with an actual feature set corresponding to the training digital image. Furthermore, the server(s) 806 can jointly minimize similarity loss functions, query-based ranking loss functions, and image-based loss functions to train the query neural network. Similarly, the server(s) 806 can also train a digital image neural network by providing training digital images to the digital image neural network and comparing a predicted feature set with an actual feature set corresponding to the training digital image.

As an additional example, in one or more embodiments, the environment 800 comprises one or more memories (e.g., at the server(s) 806 and/or the client devices 802a-802n). The one or more memories can comprise a plurality of features sets, wherein each feature set: corresponds to a digital image of a plurality of digital images, and is extracted from a layer of a digital image neural network that preserves semantic and spatial information from the corresponding digital image. Further, the one or more memories can also comprise a query neural network trained to generate query feature sets from representations of query areas and query terms, the query feature sets having a dimensionality of the features sets of the plurality of digital images.

In addition, in one or more embodiments, the server(s) 806 store instructions thereon, that, when executed by the server(s) 806, cause the system (e.g., the client devices 802a-802n and/or the server(s) 806) to: generate a representation of a query area and a query term that encodes the query term at a spatial location corresponding to the query area, wherein the query term indicates targeted visual content and the query are indicated a targeted region for portraying the targeted visual content; generate, using the query neural network, a query feature set from the representation of the query area and the query term; and identify, from the plurality of digital images, a digital image portraying the targeted visual content within the targeted region by comparing the query feature set with the plurality of feature sets. The server(s) 806 can also store instructions that, when executed by the server(s) 806, perform the steps described below in relation to FIG. 9.

Figure 9:
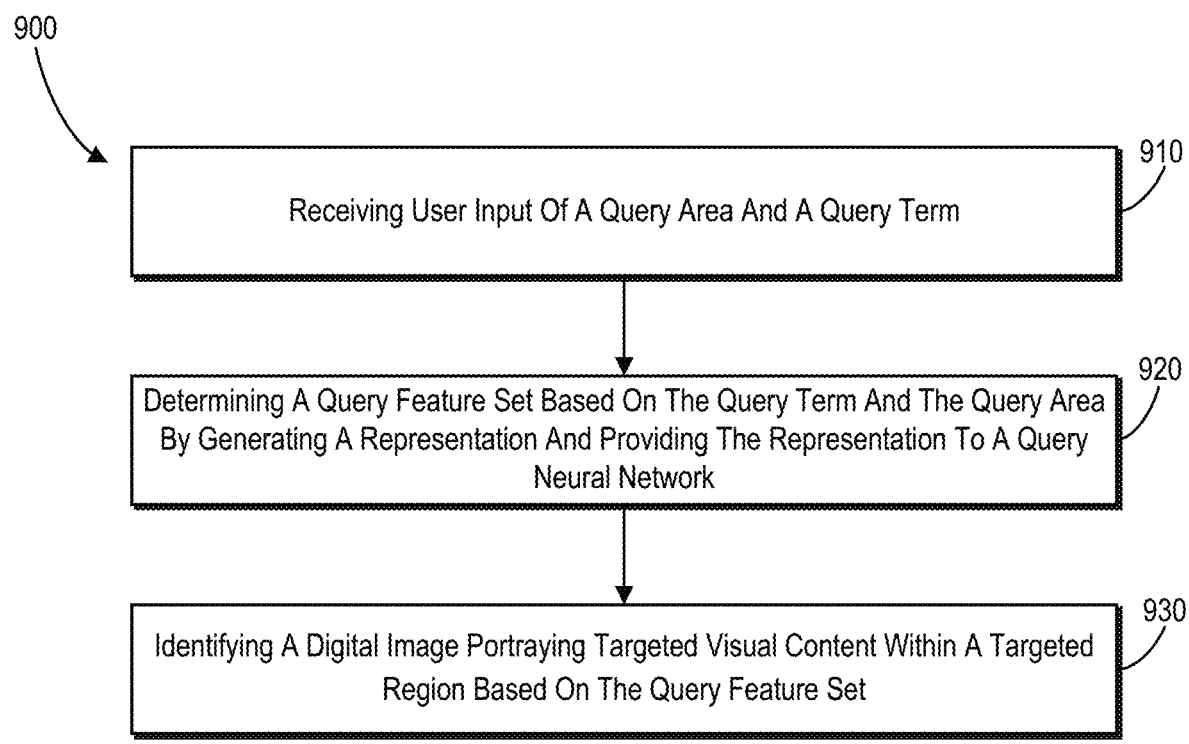
FIG. 9 illustrates a flowchart of a series of acts in a method of identifying a digital image utilizing spatial information and semantic information in accordance with one or more embodiments.

FIGS. 1A-8, the corresponding text, and the examples, provide a number of different systems and devices for rendering digital images of a virtual environment utilizing full path space learning. In addition to the foregoing, embodiments can also be described in terms of flowcharts comprising acts and steps in a method for accomplishing a particular result. For example, FIG. 9 illustrates flowcharts of exemplary methods in accordance with one or more embodiments. The methods described in relation to FIG. 9 may be performed with less or more steps/acts or the steps/acts may be performed in differing orders. Additionally, the steps/acts described herein may be repeated or performed in parallel with one another or in parallel with different instances of the same or similar steps/acts.

FIG. 9 illustrates a flowchart of a series of acts in a method 900 of utilizing spatial and semantic information to search for digital images in accordance with one or more embodiments. In one or more embodiments, the method 900 is performed in a digital medium environment that includes the spatial-semantic media search system 700. The method 900 is intended to be illustrative of one or more methods in accordance with the present disclosure, and is not intended to limit potential embodiments. Alternative embodiments can include additional, fewer, or different steps than those articulated in FIG. 9.

As illustrated in FIG. 9, the method 900 includes an act 910 of receiving user input of a query area and a query term. In particular, the act 910 can include receiving user input of a query area and a query term via a digital canvas, wherein the query term indicates targeted visual content and the query area indicates a targeted region for portraying the targeted visual content.

As illustrated in FIG. 9, the method 900 also includes an act 920 of determining a query feature set based on the query term and the query area by generating a representation and providing the representation to a query neural network. In particular, the act 920 can include determining a query feature set based on the query term and the query area, wherein determining the query feature set comprises: generating a representation of the query area and the query term; and providing the representation of the query area and the query term to a query neural network. For instance, in one or more embodiments, the query neural network comprises a convolutional neural network with three convolutional layers, two max pooling layers, and two subsampling layers. Moreover, in one or more embodiments, the act 920 further comprises converting the query term to a query term vector utilizing a word to vector algorithm; and generating a three-dimensional grid by mapping the query term vector to the query area of the digital canvas As illustrated in FIG. 9, the method 900 can also include an act 930 of identifying a digital image portraying targeted visual content within a targeted region based on the query feature set. In particular, the act 930 can include identifying, from a plurality of digital images, a digital image portraying the targeted visual content within the targeted region by comparing the query feature set to feature sets learned from the plurality of digital images using a digital image neural network. For example, in one or more embodiments, the query feature set comprises feature vectors having a dimensionality of the feature sets learned from the plurality of digital images using the digital image neural network. In addition, in one or more embodiments, the act 930 comprises extracting the feature sets from a layer of the digital image neural network that preserves semantic and spatial information from the digital images.

Moreover, the method 900 can also include an act of training a query neural network. In particular, in one or more embodiments, the method 900 includes training the query neural network by: providing as input to the query neural network a training term and a training area, the training term and the training area corresponding to an object portrayed in a training digital image, wherein the training digital image has a corresponding feature set; generating a predicted feature set by the query neural network based on the training term and the training area; and comparing the predicted feature set generated by the query neural network with the feature set corresponding to the training digital image. Further, training the query neural network can also comprise identifying a negative training term different than the training term; generating a negative training term feature set based on the negative training term; and comparing the negative training term feature set, the predicted feature set, and the feature set corresponding to the training digital image Training the query neural network can also include identifying a negative digital image that portrays an object different than the training term; generating a negative digital image feature set from the negative digital image; and comparing the predicted feature set, the negative digital image feature set, and the feature set corresponding to the training digital image. In addition, training the query neural network can also comprise constructing a training structure that includes: a similarity loss function, an image-based ranking loss function, and a query-based ranking loss function, wherein: the similarity loss function compares a similarity between the predicted feature set and the feature set corresponding to the training digital image; the image-based ranking loss function compares a similarity between the predicted feature set and the feature set corresponding to the training digital image and a measure of dissimilarity between the predicted feature set and the negative training term feature set; and the query-based ranking loss function compares a similarity between the predicted feature set and the feature set corresponding to the training digital image and a measure of dissimilarity between the predicted feature set and the negative digital image feature set. Indeed, in one or more embodiments, the the query neural network jointly minimizes the similarity loss function, the image-based ranking loss function, and the query-based ranking loss function.

Training the digital image can further comprise generating the feature set corresponding to the training digital image. In particular, generating the feature set corresponding to the training digital image can comprise identifying an object portrayed in the training digital image and an object boundary corresponding to the object portrayed in the training digital image; and applying a spatial mask to a region of the training digital image outside of the object boundary.

The method 900 can also include receiving user input of a second query term and a second query area via the digital canvas in addition to the query term and the query area, wherein the query term indicates a second targeted visual content and the second query area indicates a second targeted region for portraying the targeted visual content; generating a second query feature set using the query neural network by providing the second query term, the second query area, and the query feature set to the query neural network; and identifying, from the plurality of digital images, at least one digital image portraying the targeted visual content within the targeted region and the second targeted visual content within the second targeted region by comparing the second query feature set and the feature sets learned from the plurality of digital images using the digital image neural network.

In addition, the method 900 can also include receiving a second query term and a second query area via the digital canvas; modifying the query feature set utilizing the query neural network to reflect the second query term and the second query area; and identifying at least one digital image by comparing the modified query feature set and the feature sets corresponding to the plurality of digital images.

Embodiments can also be described in terms of computer implemented methods or systems. For example, one or more embodiments include, in a digital medium environment, a computer-implemented method of searching for and identifying digital images based on semantic and spatial information, comprising:

receiving user input of a query area and a query term via a digital canvas, wherein the query term indicates targeted visual content and the query area indicates a targeted region for portraying the targeted visual content;

a step for generating a query feature set from the query area and the query term using a query neural network; and identifying, from a plurality of digital images, a digital image portraying the targeted visual content within the targeted region by comparing the query feature set to feature sets learned from the plurality of digital images using a digital image neural network.

Furthermore, the method can also include, wherein the query feature set comprises feature vectors having a dimensionality of the feature sets learned from the plurality of digital images using the digital image neural network.

The method can also further comprise training the query neural network by:

providing as input to the query neural network a training term and a training area, the training term and the training area corresponding to an object portrayed in a training digital image, wherein the training digital image has a corresponding feature set;

generating a predicted feature set by the query neural network based on the training term and the training area; and comparing the predicted feature set generated by the query neural network with the feature set corresponding to the training digital image.

Furthermore, the method can also include, wherein training the query neural network further comprises:

identifying a negative training term different than the training term;

generating a negative training term feature set based on the negative training term; and comparing the negative training term feature set, the predicted feature set, and the feature set corresponding to the training digital image.

In addition, the method can also include, wherein training the query neural network further comprises:

identifying a negative digital image that portrays an object different than the training term;

generating a negative digital image feature set from the negative digital image; and comparing the predicted feature set, the negative digital image feature set, and the feature set corresponding to the training digital image.

The method can also include, wherein training the query neural network comprises constructing a training structure that includes:

a similarity loss function, an image-based ranking loss function, and a query-based ranking loss function, wherein:

the similarity loss function compares a similarity between the predicted feature set and the feature set corresponding to the training digital image;

the image-based ranking loss function compares a similarity between the predicted feature set and the feature set corresponding to the training digital image and a measure of dissimilarity between the predicted feature set and the negative training term feature set; and the query-based ranking loss function compares a similarity between the predicted feature set and the feature set corresponding to the training digital image and a measure of dissimilarity between the predicted feature set and the negative digital image feature set.

The method can also include, wherein the query neural network jointly minimizes the similarity loss function, the image-based ranking loss function, and the query-based ranking loss function.

The method can further comprise extracting the feature sets from a layer of the digital image neural network that preserves semantic and spatial information from the digital images.

The method can also comprise:

receiving user input of a second query term and a second query area via the digital canvas in addition to the query term and the query area, wherein the query term indicates a second targeted visual content and the second query area indicates a second targeted region for portraying the targeted visual content;

generating a second query feature set using the query neural network by providing the second query term, the second query area, and the query feature set to the query neural network; and identifying, from the plurality of digital images, at least one digital image portraying the targeted visual content within the targeted region and the second targeted visual content within the second targeted region by comparing the second query feature set and the feature sets learned from the plurality of digital images using the digital image neural network.

In addition, one or more embodiments also include, in a digital medium environment, a computer-implemented method of searching for and identifying digital images based on semantic and spatial information, comprising:

receiving user input of a query term and query area corresponding to a digital canvas, wherein the query term indicates targeted visual content and the query area indicates a targeted region for portraying the targeted visual content;

determining a query feature set based on the query term and the query area, wherein determining the query feature set comprises:

generating a representation of the query area and the query term; and providing the representation of the query area and the query term to a query neural network; and identifying, from a plurality of digital images, a digital image portraying the targeted visual content within the targeted region by comparing the query feature set to feature sets learned from the plurality of digital images using a digital image neural network.

The method can also include, wherein the query neural network comprises a convolutional neural network with three convolutional layers, two max pooling layers, and two sub sampling layers.

The method can also include, wherein generating the representation of the query area and the query term comprises:

converting the query term to a query term vector utilizing a word to vector algorithm; and generating a three-dimensional grid by mapping the query term vector to the query area of the digital canvas.

The method can further comprise training the query neural network by:

providing as input to the query neural network a training term and a training area, the training term and the training area corresponding to an object portrayed in a training digital image, wherein the training digital image has a corresponding feature set;

generating a predicted feature set by the query neural network based on the training term and the training area; and comparing the predicted feature set generated by the query neural network with the feature set corresponding to the training digital image.

The method can also include, wherein training the query neural network further comprises:

determining a negative training term different than the training term;

generating a negative training term feature set based on the negative training term;

identifying a negative digital image that portrays an object different than the training term, the negative digital image having a negative digital image feature set; and utilizing a loss function to compare the negative training term feature set, the negative digital image feature set, the predicted feature set, and the feature set corresponding to the training digital image.

The method can further comprise generating the feature set corresponding to the training digital image by:
    identifying an object portrayed in the training digital image and an object boundary corresponding to the object portrayed in the training digital image; and
    applying a spatial mask to a region of the training digital image outside of the object boundary.

The method can further comprise:
    receiving a second query term and a second query area via the digital canvas;
    modifying the query feature set utilizing the query neural network to reflect the second query term and the second query area; and
    identifying at least one digital image by comparing the modified query feature set and the digital feature sets corresponding to the plurality of digital images.

In addition, one or more embodiments also include a system for identifying digital images based on semantic and spatial information, comprising:
    one or more memories comprising:
        a plurality of features sets, wherein each feature set:
            corresponds to a digital image of a plurality of digital images, and
            is extracted from a layer of a digital image neural network that preserves semantic and spatial information from the corresponding digital image;
        a query neural network trained to generate query feature sets from representations of query areas and query terms, the query feature sets having a dimensionality of the features sets of the plurality of digital images;
    at least one server storing instructions thereon, that, when executed by the at least one server, cause the system to:
        generate a representation of a query area and a query term that encodes the query term at a spatial location corresponding to the query area, wherein the query term indicates targeted visual content and the query are indicated a targeted region for portraying the targeted visual content;
        generate, using the query neural network, a query feature set from the representation of the query area and the query term; and
        identify, from the plurality of digital images, a digital image portraying the targeted visual content within the targeted region by comparing the query feature set with the plurality of feature sets.

The system can include, wherein the query neural network comprises a convolutional neural network with three convolutional layers, two max pooling layers, and two subsampling layers.

The system can also include wherein the server further comprises instructions that, when executed by the at least one server, further causes the system to generate the representation of the query area and the query term by performing acts comprising:
    converting the query term to a query term vector utilizing a word to vector algorithm; and
    generating a three-dimensional grid by mapping the query term vector to the spatial location corresponding to the query area.

The system can further comprise instructions that, when executed by the at server, further cause the system to:
    receive user input of a second query term and a second query area in addition to the query term and the query area, wherein the second query term indicates second targeted visual content and the second query area indicates a second targeted region for portraying the second targeted visual content;
    generate, using the query neural network, a second query feature set by providing the second query term, the second query area, and the query feature set to the trained neural network; and
    identify, from the plurality of digital images, at least one digital image portraying the targeted visual content within the targeted region and the second targeted visual content within the second targeted region by comparing the second query feature set with the plurality of feature Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
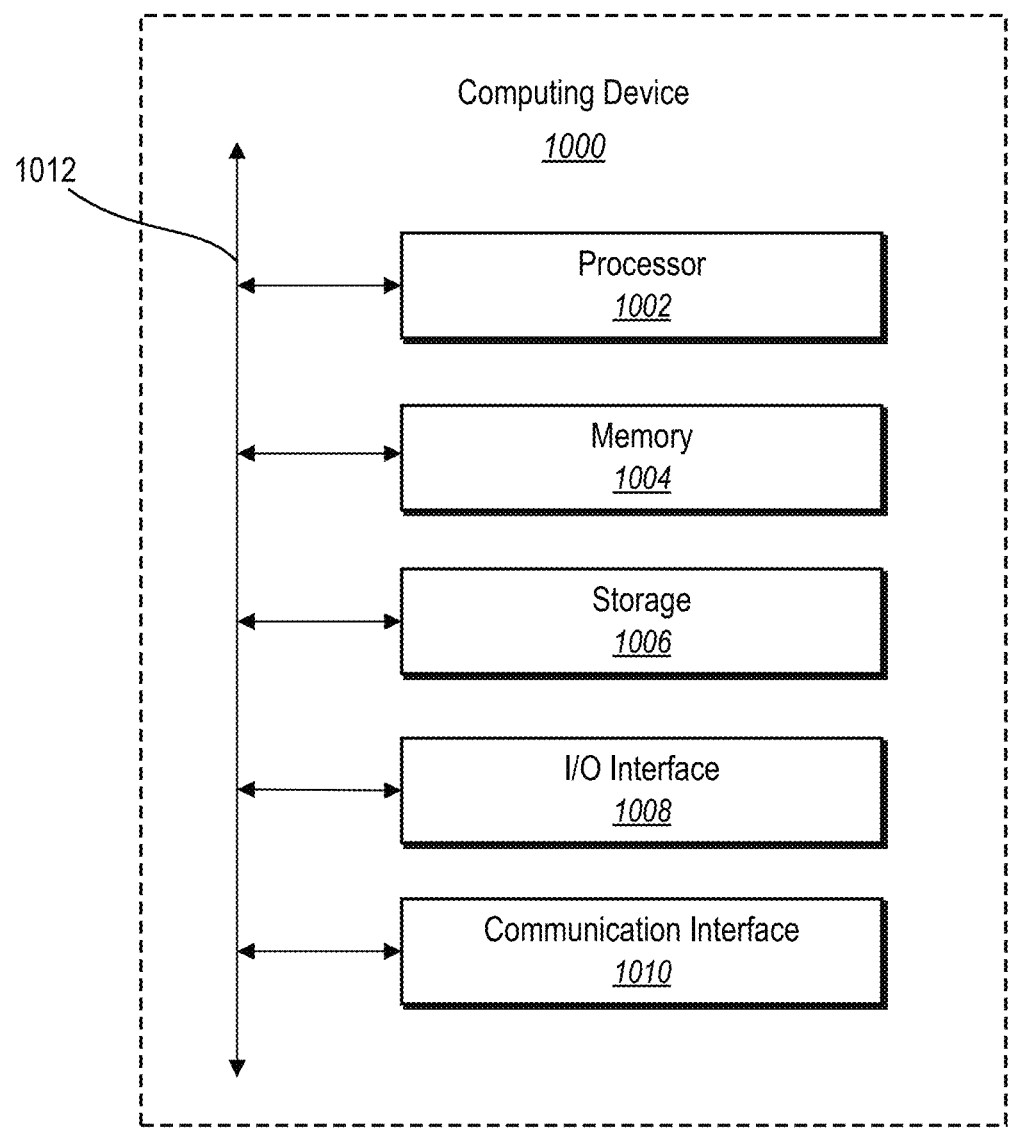
FIG. 10 illustrates a block diagram of an exemplary computing device in accordance with one or more embodiments.

FIG. 10 illustrates, in block diagram form, an exemplary computing device 1000 that may be configured to perform one or more of the processes described above. One will appreciate that the spatial-semantic media search system 700 can comprise implementations of the computing device 1000. As shown by FIG. 10, the computing device can comprise a processor 1002, memory 1004, a storage device 1006, an I/O interface 1008, and a communication interface 1010. In certain embodiments, the computing device 1000 can include fewer or more components than those shown in FIG. 10. Components of computing device 1000 shown in FIG. 10 will now be described in additional detail.

In particular embodiments, processor(s) 1002 includes hardware for executing instructions, such as those making up a computer program. As an example and not by way of limitation, to execute instructions, processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example and not by way of limitation, storage device 1006 can comprise a non-transitory storage medium described above. The storage device 1006 may include a hard disk drive (HDD), flash memory, a Universal Serial Bus (USB) drive or a combination of these or other storage devices.

The computing device 1000 also includes one or more input or output ("I/O") devices/interfaces 1008, which are provided to allow a user to provide input to (such as user strokes), receive output from, and otherwise transfer data to and from the computing device 1000. These I/O devices/interfaces 1008 may include a mouse, keypad or a keyboard, a touch screen, camera, optical scanner, network interface, modem, other known I/O devices or a combination of such I/O devices/interfaces 1008. The touch screen may be activated with a stylus or a finger.

The I/O devices/interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1008 is configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 can provide one or more interfaces for communication (such as, for example, packet-based communication) between the computing device and one or more other computing devices 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can comprise hardware, software, or both that couples components of computing device 1000 to each other.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

We claim:

1. A computer-implemented method of searching for and identifying digital images utilizing semantic and spatial information, the method comprising:
   providing, for display via a user interface of a client device, a spatial semantic search canvas;
   identifying, via the spatial semantic search canvas, user input positioning a shape associated with a query concept at a location within the spatial semantic search canvas;
   generating a three-dimensional grid by mapping the query concept to the location of the spatial semantic search canvas;
   generating a query feature set from the three-dimensional grid utilizing a neural network; and
   based on the query feature set, determining, from a plurality of digital images, a digital image portraying visual content reflecting the query concept at the location within the digital image.

2. The computer-implemented method of claim 1, further comprising identifying an additional user input positioning an additional shape associated with an additional query concept at an additional location within the spatial semantic search canvas.

3. The computer-implemented method of claim 2, further comprising based on the user input and the additional user input, determining from the plurality of digital images, an additional digital image portraying the query concept at the location within the digital image and the additional query concept at the additional location within the digital image.

4. The computer-implemented method of claim 1, further comprising generating the three-dimensional grid by:
   extracting one or more words from the query concept; and
   generating one or more word vectors from the one or more words utilizing a word to vector algorithm.

5. The computer-implemented method of claim 4, further comprising generating the three-dimensional grid by mapping the one or more word vectors to the location of the spatial semantic search canvas.

6. The computer-implemented method of claim 1, wherein determining the digital image portraying the visual content reflecting the query concept at the location within the digital image comprises identifying a plurality of feature sets corresponding to the plurality of digital images.

7. The computer-implemented method of claim 6, wherein determining to the digital image portraying the visual content reflecting the query concept at the location within the digital image comprises comparing the plurality of feature sets corresponding to the plurality of digital images with the query feature set based on the shape and the query concept at the location.

8. A non-transitory computer readable medium storing instructions thereon that, when executed by at least one processor, cause a computer system to:
   provide, for display via a user interface of a client device, a spatial semantic search canvas;
   identify, via the spatial semantic search canvas, user input positioning a shape associated with a query concept at a location within the spatial semantic search canvas;
   generate a three-dimensional grid by mapping the query concept to the location of the spatial semantic search canvas;
   generate a query feature set from the three-dimensional grid utilizing a neural network; and
   based on the query feature set, determine, from a plurality of digital images, a digital image portraying visual content reflecting the query concept at the location within the digital image.

9. The non-transitory computer readable medium of claim 8, further comprising instructions that, when executed by the at least one processor, cause the computer system to:
   identify an additional user input positioning an additional shape associated with an additional query concept at an additional location within the spatial semantic search canvas; and
   based on the user input and the additional user input, determine from the plurality of digital images, an additional digital image portraying the query concept at the location within the digital image and the additional query concept at the additional location within the digital image.

10. The non-transitory computer readable medium of claim 8, further comprising instructions that, when executed by the at least one processor, cause the computer system to determine the digital image portraying the visual content reflecting the query concept at the location within the digital image by:
   determining a query feature set based on the shape and the query concept at the location;
   identifying a plurality of feature sets corresponding to the plurality of digital images; and
   comparing the plurality of feature sets corresponding to the plurality of digital images with the query feature set based on the shape and the query concept at the location.

11. The non-transitory computer readable medium of claim 10, wherein determining the query feature set based on the shape and the query concept comprises generating a three-dimensional grid by mapping the query concept to the location of the spatial semantic search canvas.

12. The non-transitory computer readable medium of claim 11, wherein determining the query feature set further comprising analyzing the three-dimensional grid via a convolutional neural network to generate the query feature set.

13. A system comprising:
   one or more memory devices comprising a plurality of digital images; and
   a server configured to cause the system to:
      provide, for display via a user interface of a client device, a spatial semantic search canvas;
      identify, via the spatial semantic search canvas, user input positioning a shape associated with a query concept at a location within the spatial semantic search canvas;
      generate a three-dimensional grid by mapping the query concept to the location of the spatial semantic search canvas;

generate a query feature set from the three-dimensional grid utilizing a neural network; and based on the query feature set, determine, from the plurality of digital images, a digital image portraying visual content reflecting the query concept at the location within the digital image.

14. The system of claim 13, wherein the server is further configured to cause the system to receive an additional user input positioning an additional shape associated with an additional query concept at an additional location within the spatial semantic search canvas.

15. The system of claim 14, wherein the server is further configured to cause the system to determine from the plurality of digital images, based on the user input and the additional user input, an additional digital image portraying the query concept at the location within the digital image and portraying the additional query concept at the additional location within the digital image.

16. The system of claim 13, wherein the server is further configured to cause the system to determine the digital image portraying the visual content reflecting the query concept at the location within the digital image by identifying a plurality of feature sets corresponding to the plurality of digital images.

17. The system of claim 16, wherein the server is further configured to cause the system to determine the digital image portraying the visual content reflecting the query concept at the location within the digital image by comparing the plurality of feature sets corresponding to the plurality of digital images with the query feature set.

18. The system of claim 13, wherein the server is further configured to cause the system to provide, for display via the client device, the digital image portraying the visual content reflecting the query concept at the location within the digital image.

19. The system of claim 13, wherein the server is further configured to cause the system to generate the three-dimensional grid by:

extracting a word from the query concept; and generating a word vector from the word utilizing a word to vector algorithm.

20. The system of claim 19, wherein the server is further configured to cause the system to generate the three-dimensional grid by mapping the word vector to the location of the spatial semantic search canvas.

* * * * *